Dec. 13, 1966  M. GESKO  3,290,966
DRILL SPINDLE POSITIONING MEANS
Filed Jan. 16, 1964  11 Sheets-Sheet 9
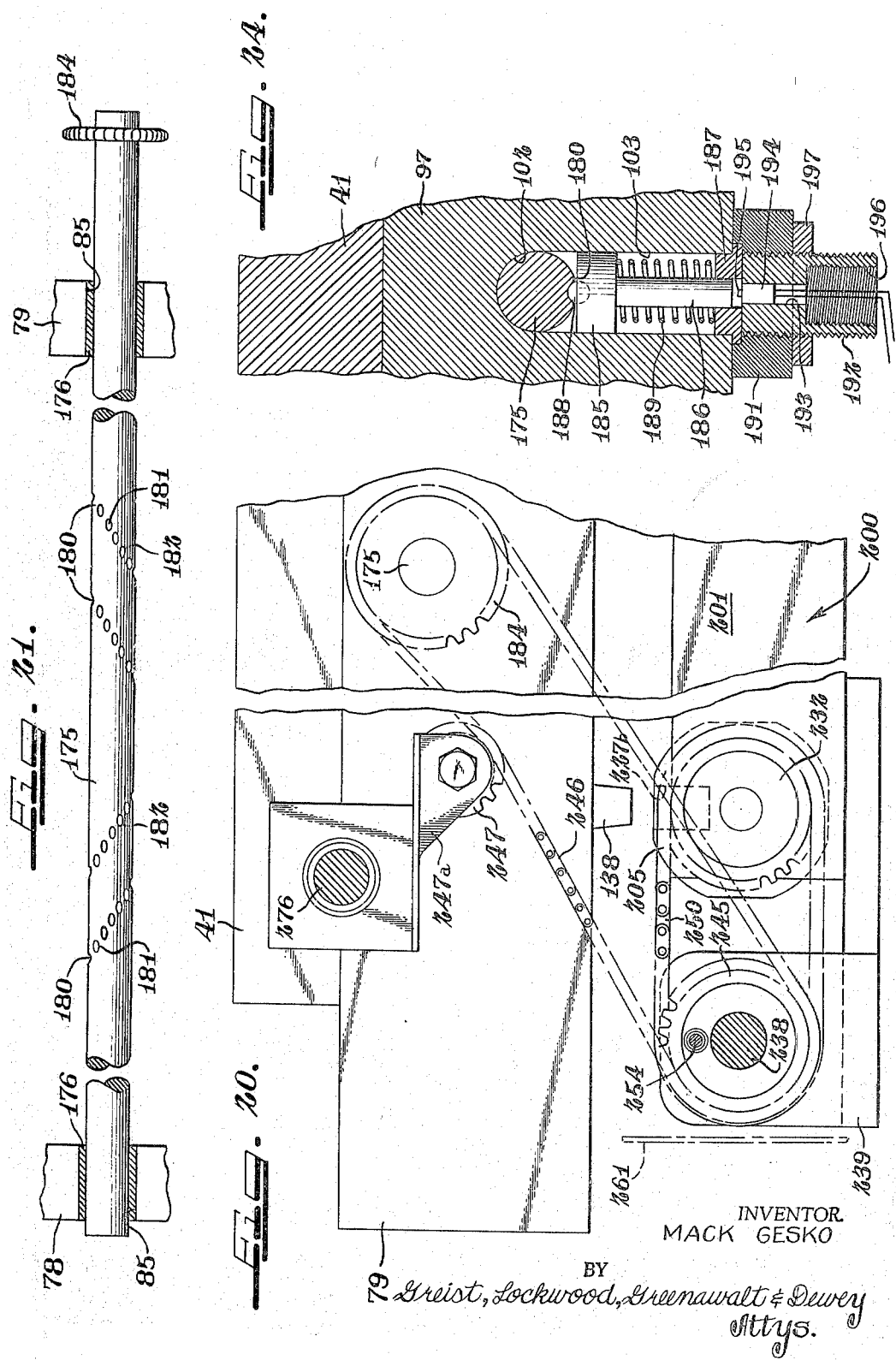
INVENTOR.
MACK GESKO
BY Greist, Lockwood, Greenawalt & Dewey
Attys.

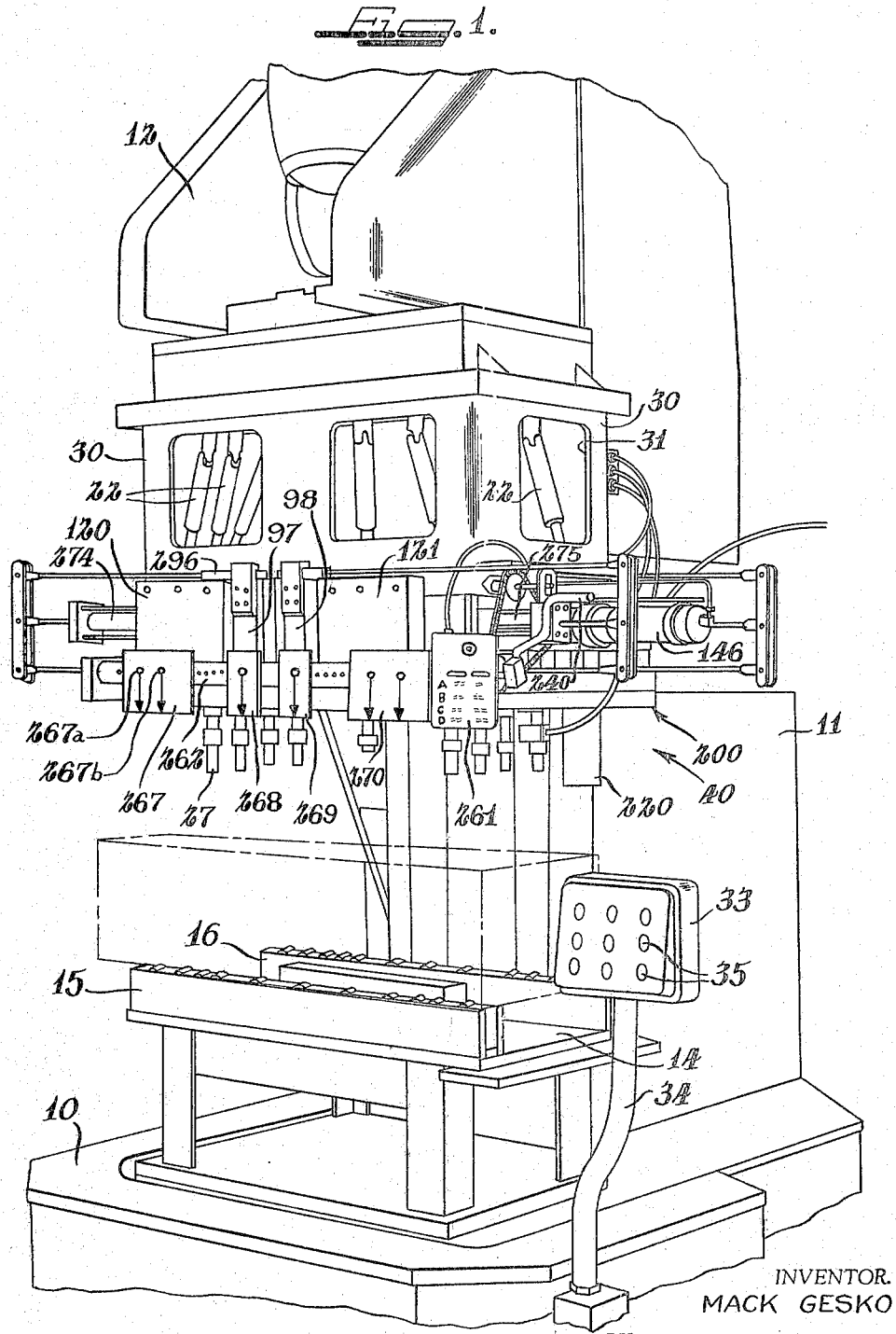

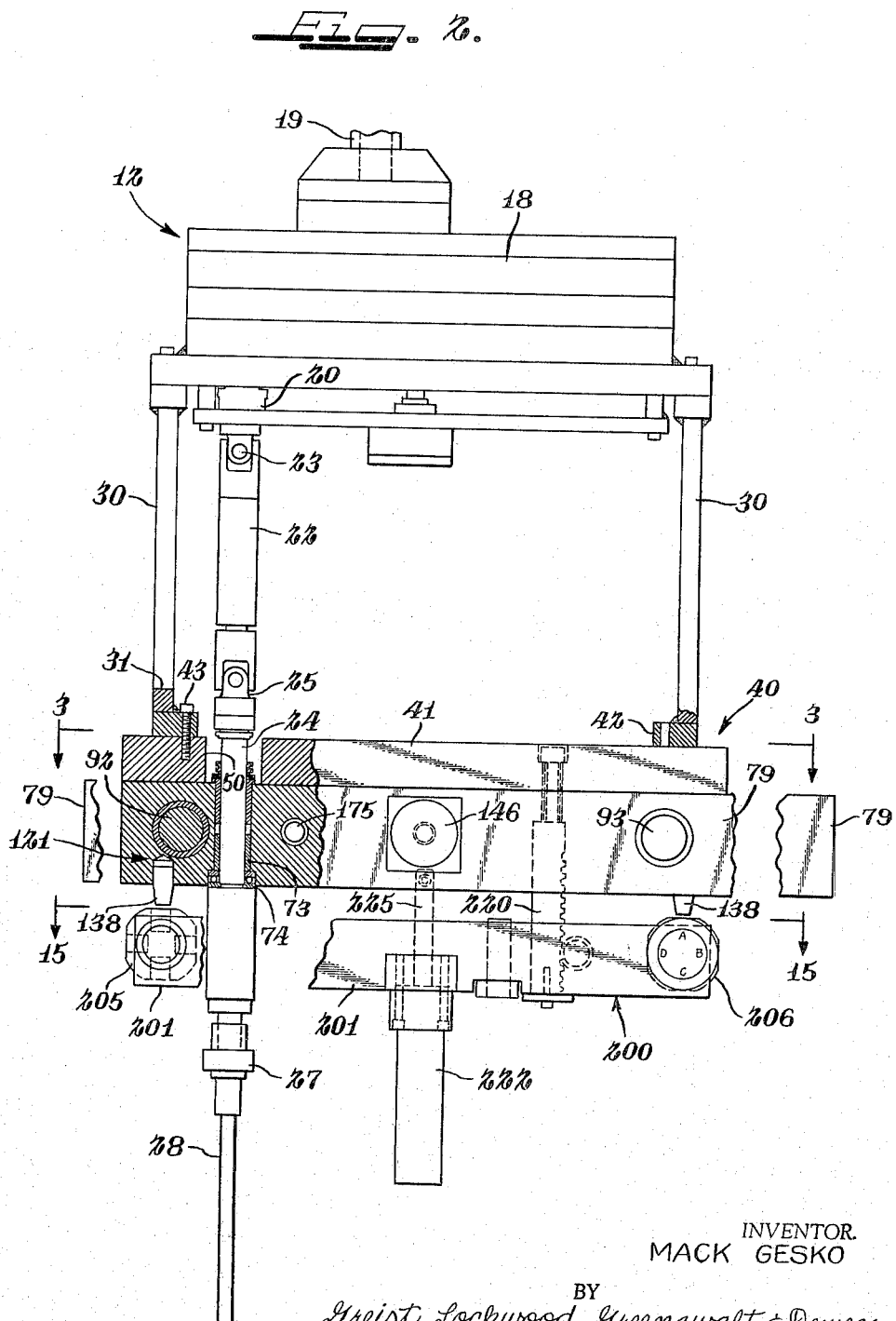

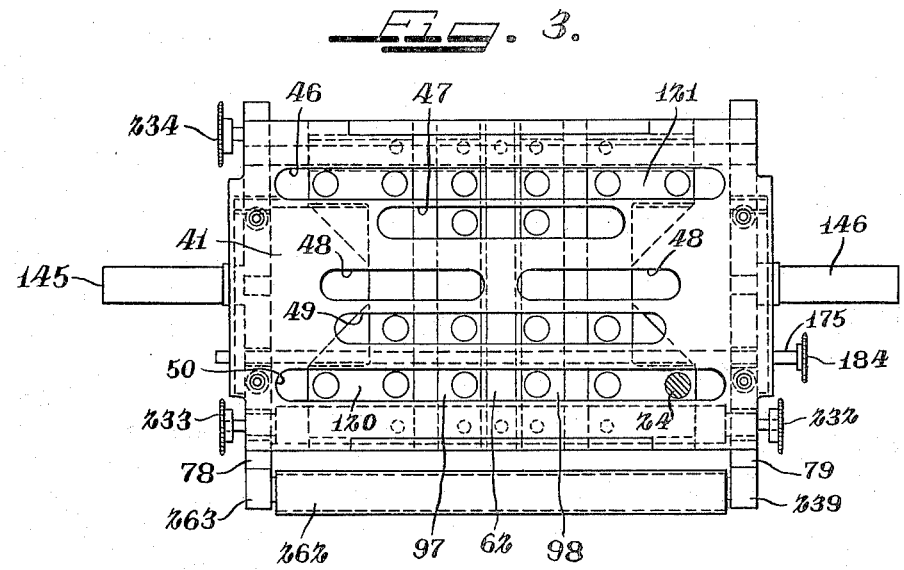
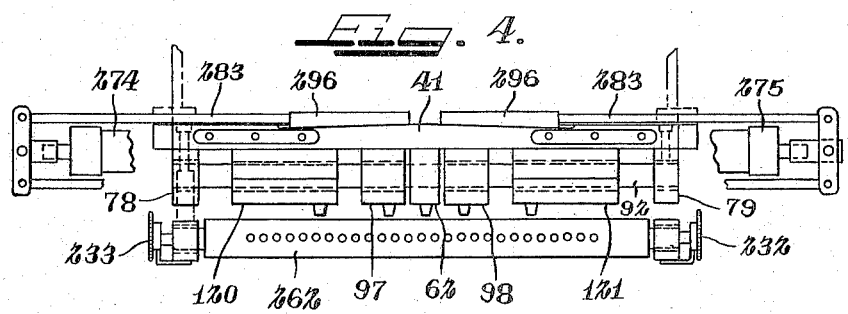
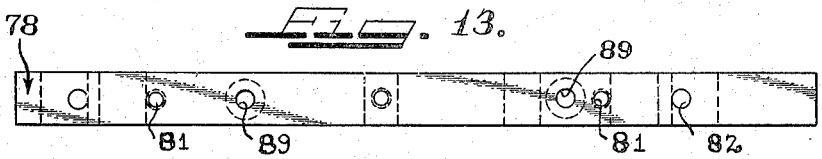
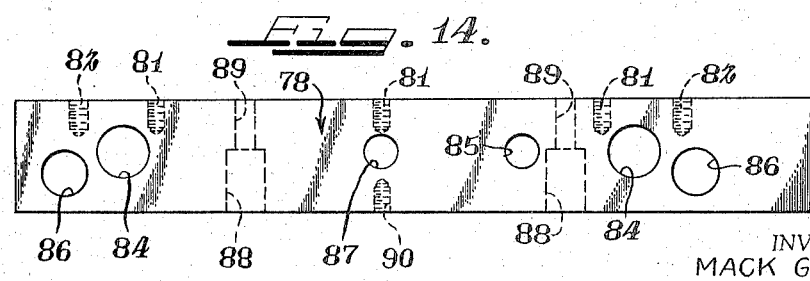

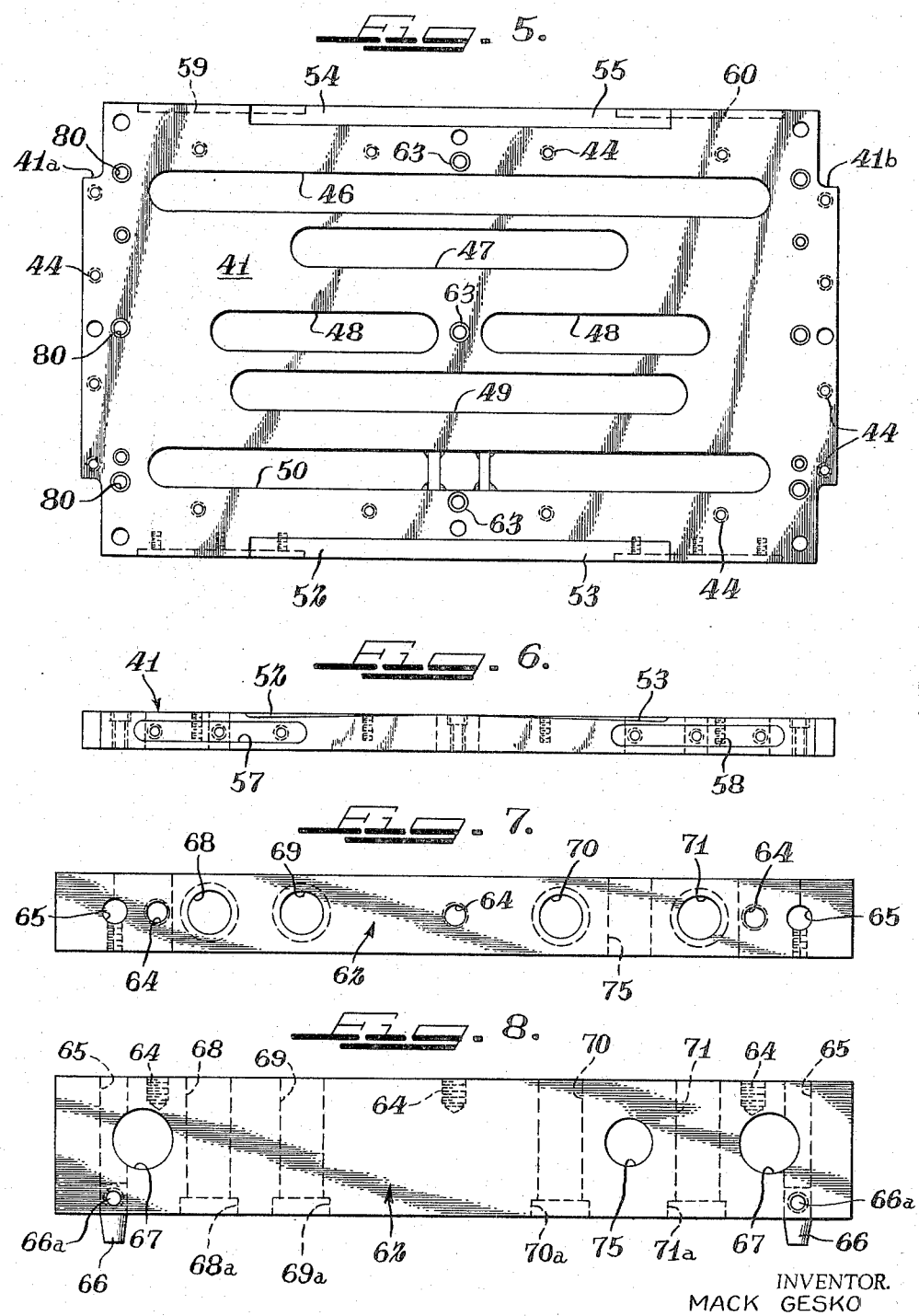

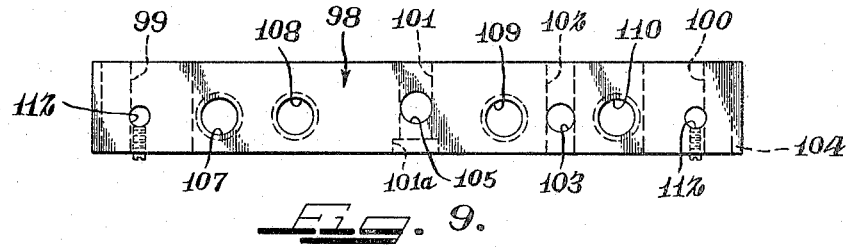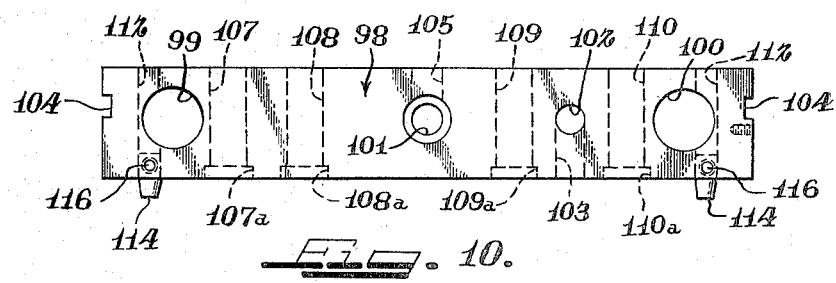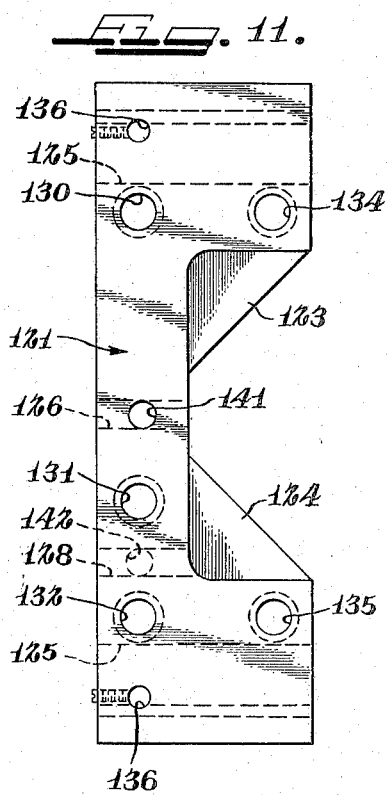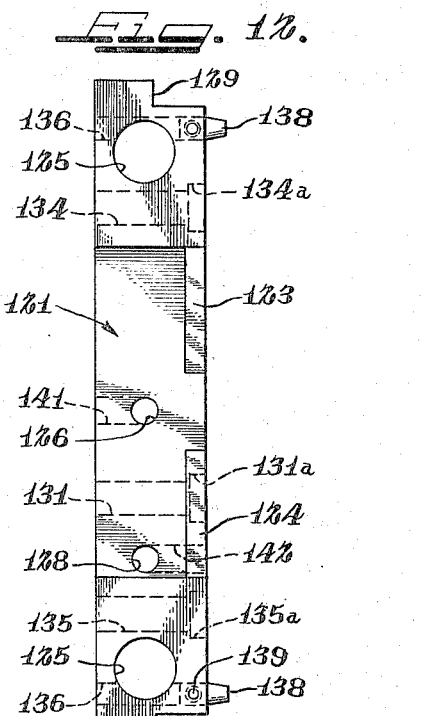

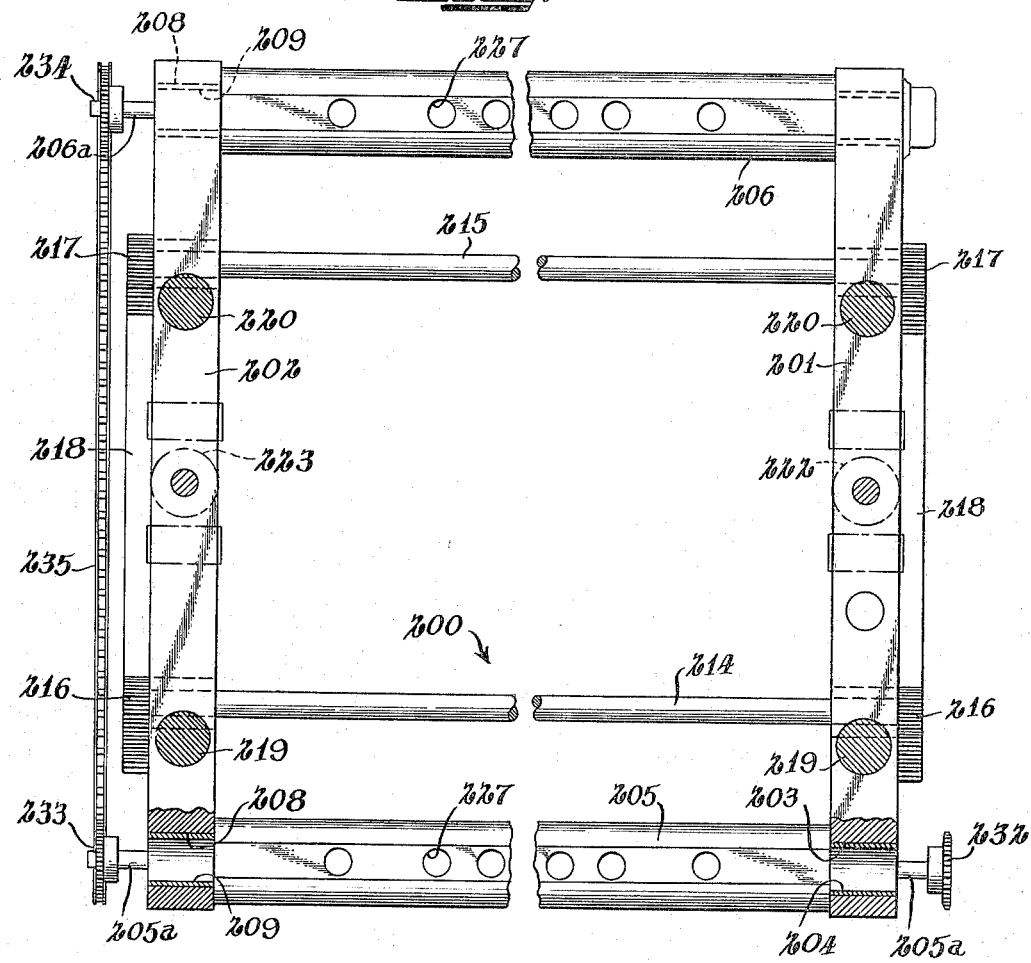

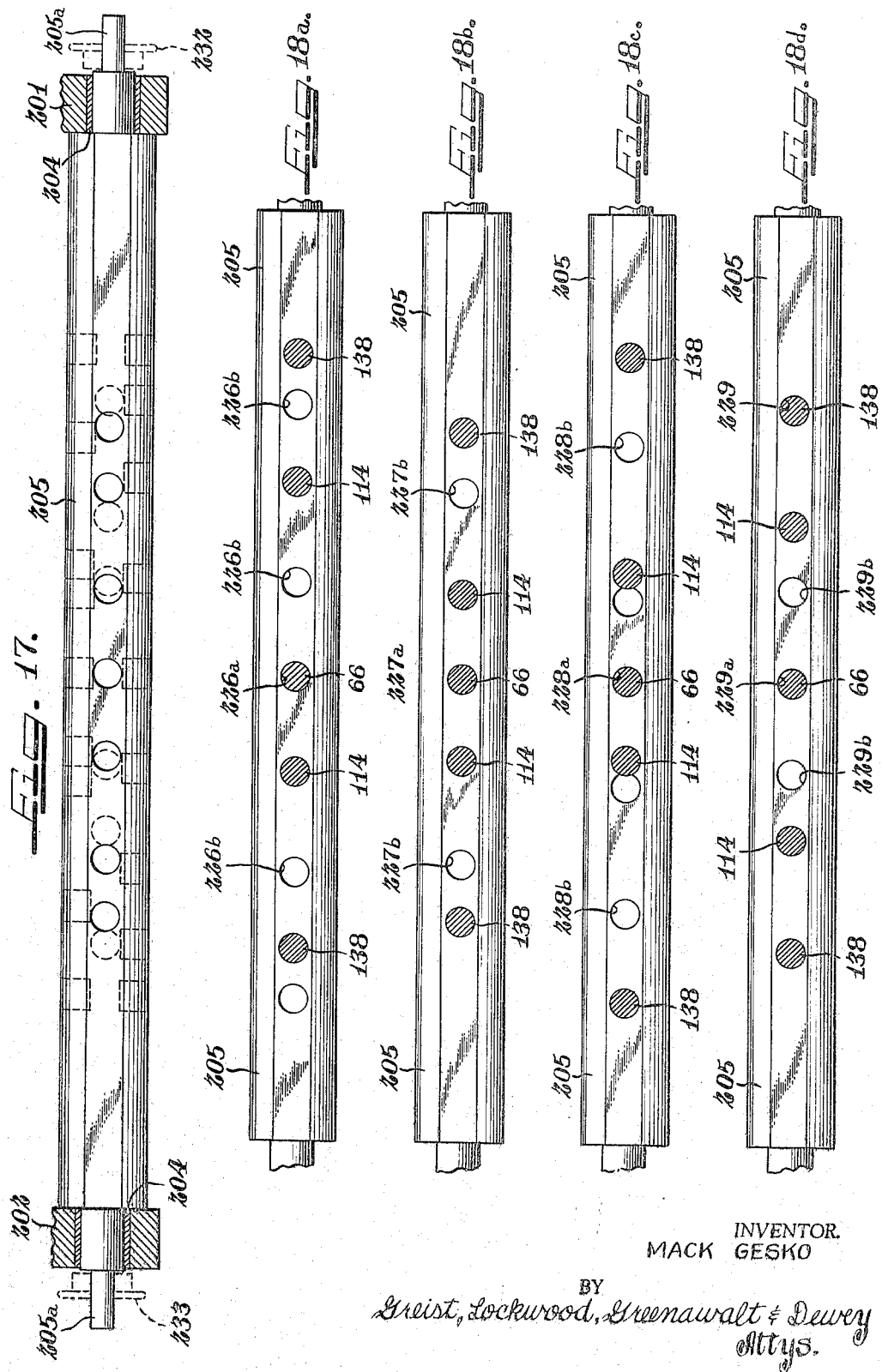

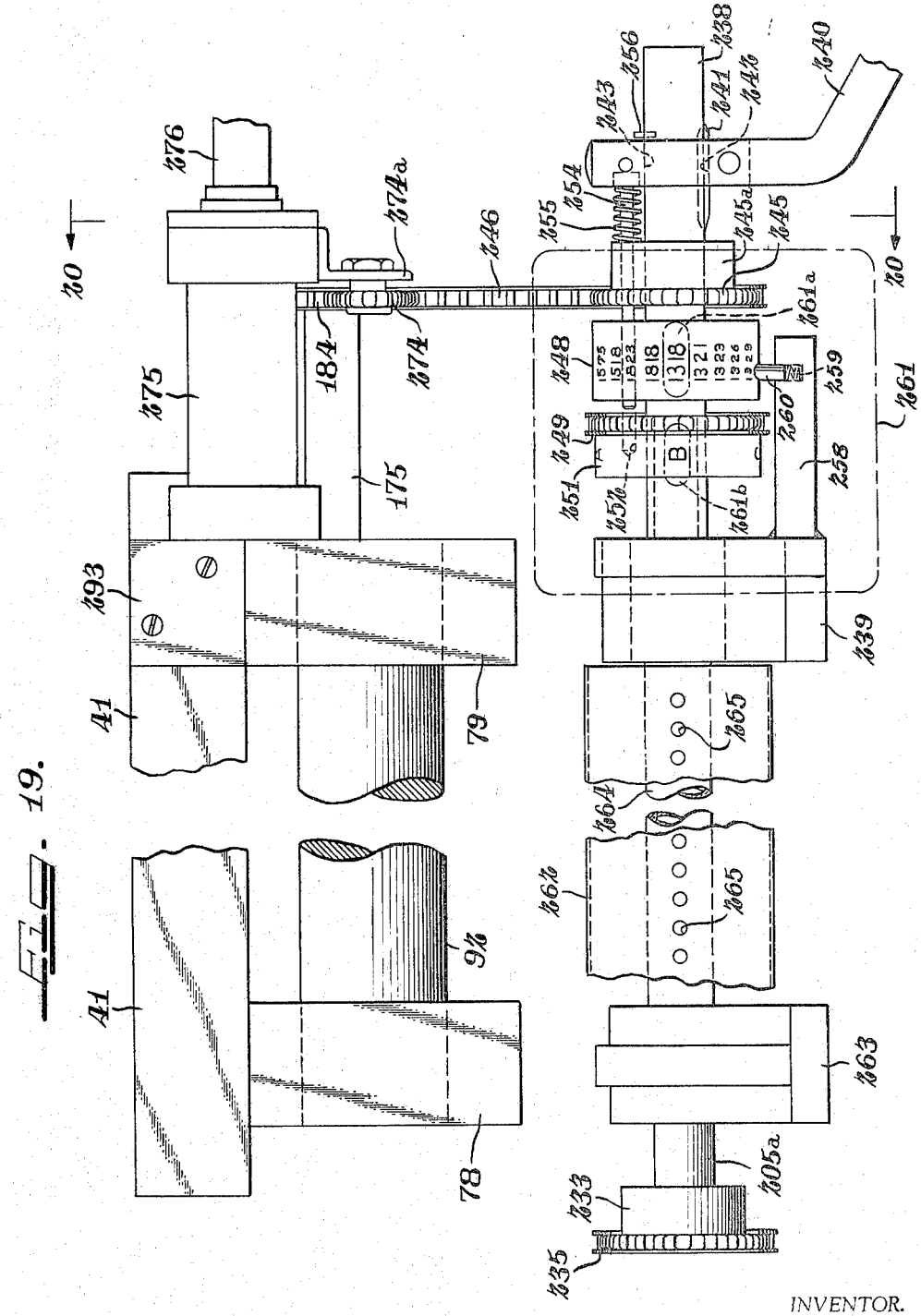

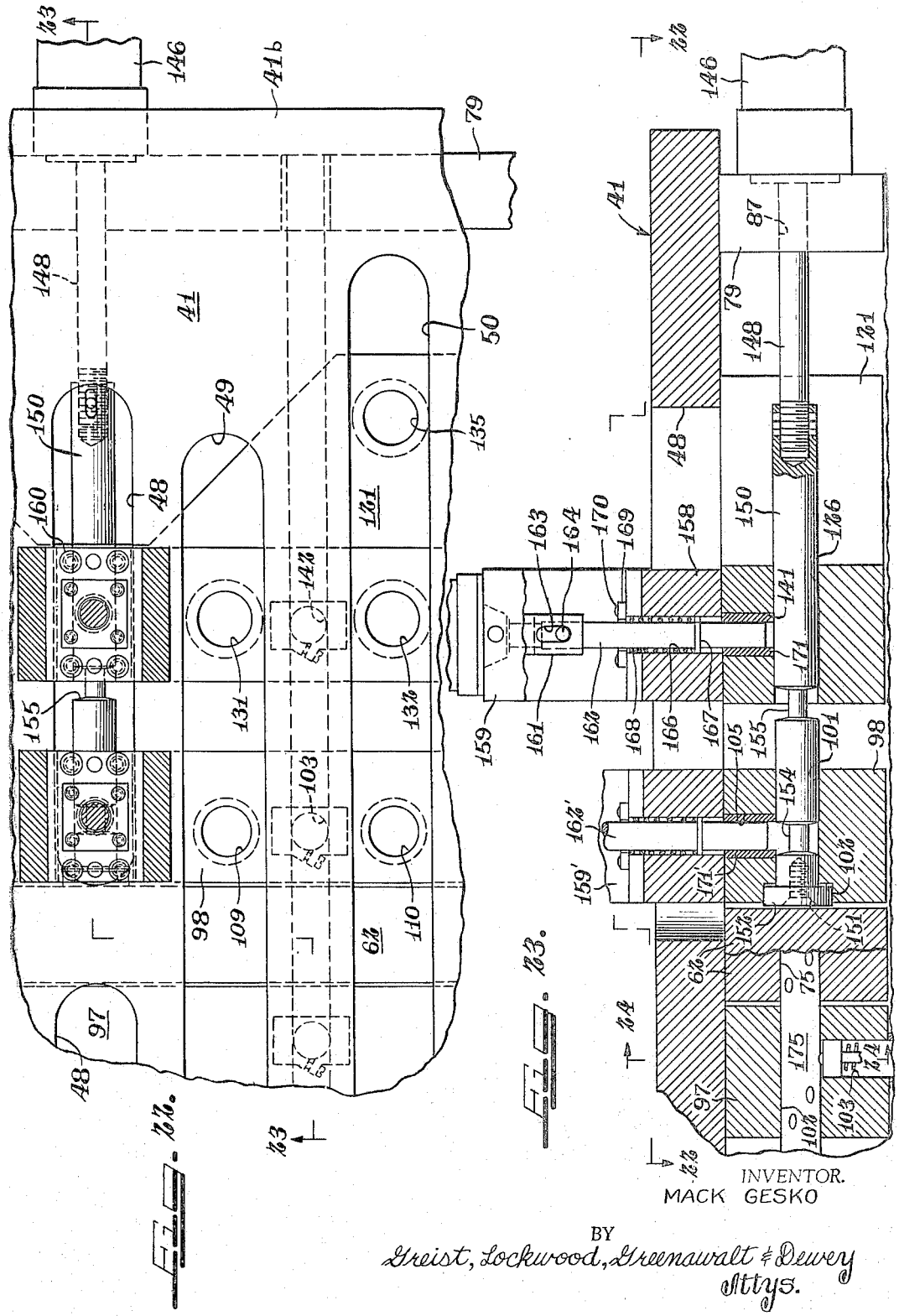

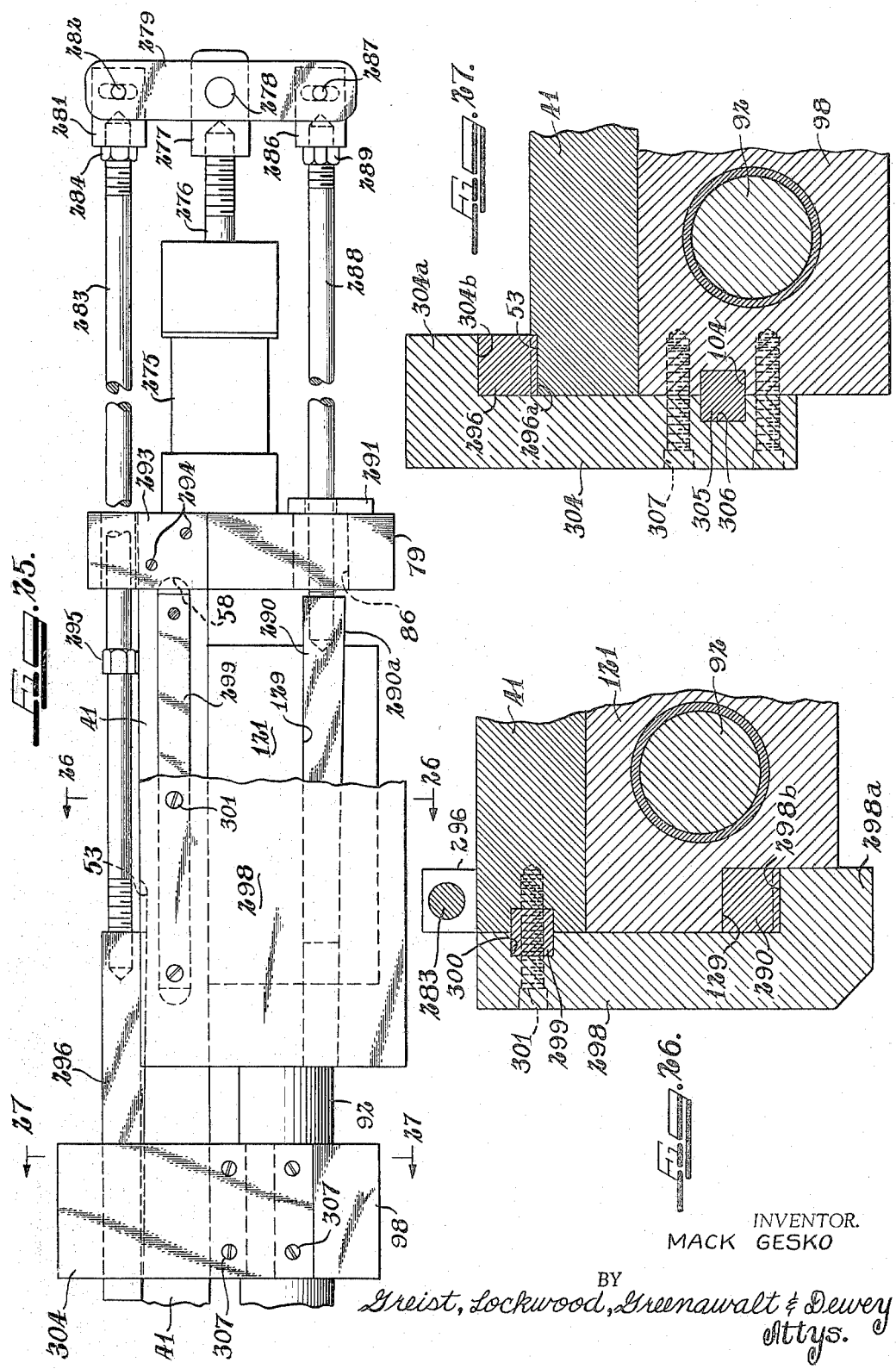

United States Patent Office 3,290,966
Patented Dec. 13, 1966

3,290,966
DRILL SPINDLE POSITIONING MEANS
Mack Gesko, Mount Clemens, Mich., assignor to D-M-E Corporation, Detroit, Mich., a corporation of Michigan
Filed Jan. 16, 1964, Ser. No. 338,090
20 Claims. (Cl. 77—22)

This invention relates to drill presses of the type having a plurality of drill spindles, and more particularly to new and improved means for positioning the drill spindles of such a drill press.

More specifically, the present invention concerns an apparatus for use with a drill press of the type having a plurality of drill spindles for detachably mounting and rotating a corresponding number of drill bits for simultaneously boring in a piece of work a number of holes in accordance with a predetermined pattern. Usually, this type of drill press includes a base assembly supporting a pedestal which mounts a head assembly for vertical reciprocal movement. The base assembly includes suitable means for supporting a workpiece so that the surface thereof to be bored is held in generally horizontal disposition. The head assembly of the drill press carries a number of depending drill spindles certain or all of which may support respective drill bits, and the head assembly carries the necessary power means for driving or rotating the drill spindles whereby upon lowering of the head assembly a number of holes may be simultaneously bored in a workpiece.

In a drill press of the type described, the drill spindles are adjustably mounted or supported in the head assembly of the drill press for movement transversely of their axes of rotation to permit the spindles to be set up for drilling a number of holes in a workpiece in accordance with a predetermined pattern. When it is desired to change the pattern of holes to be drilled, the spindles are adjusted or moved to positions corresponding to the different pattern of holes to be formed in a workpiece. As is known to those skilled in the art it is a rather laborious and time consuming operation to set up or adjust these drill spindles manually. Accordingly, it is a primary object of the present invention to provide an apparatus for use with a drill press of the type described whereby the drill spindles thereof may be set up or positioned quickly and easily in a semi-automatic manner.

It is another object of the present invention to provide an apparatus for positioning a plurality of drill spindles, which apparatus includes a number of independently movable spindle positioning heads and means for locating or positioning the heads.

It is a further object of the present invention to provide an apparatus of the type described which includes a number of independently movable spindle positioning heads and means for locating or positioning heads along a rectilinear path which is contained in a plane disposed generally normal to the axes of rotation of the drill spindles.

Another object of the present invention is the provision of an apparatus of the type described which includes a number of independently movable spindle positioning heads and selector rod means uniquely co-operating with positioning rod means thereby to position the heads along a rectilinear path which is contained in a plane disposed generally normal to the axes of rotation of the drill spindles.

Still another object of the present invention is the provision of an apparatus of the type described which includes, a number of drill spindle positioning heads each of which is adapted to support a plurality of drill spindles in parallel spaced relation, selector rod means and positioning rod means for approximately positioning the heads along a path contained in a plane disposed generally normal to the axes of rotation of the drill spindles, and positive locator means for positively and accurately positioning the heads along said path.

Even another object of the present invention is the provision of an apparatus of the type described for use with a multi-spindle drill press, which apparatus includes, a number of independently movable spindle positioning heads, selector rod means and positioning rod means for positioning the heads at predetermined locations along a path contained in a plane disposed generally normal to the axes of rotation of the drill spindles, and indicator means for indicating the arrangement of drill bits to be connected with the drill spindles.

Still another object of the present invention is the provision of an apparatus of the type described which includes, a number of independently movable spindle positioning heads, means for positioning the heads in a semi-automatic manner in predetermined locations along a rectilinear path, and clamp means for securing the heads in place after they have been positioned.

These and other objects and advantages of the present invention will become apparent from the following specification disclosing a preferred embodiment of the invention which is illustrated in the accompanying drawings.

In the drawings:

FIG. 1 is a perspective view of a drill press having the apparatus of this invention associated therewith;

FIG. 2 is an enlarged fragmentary side elevation of the apparatus of this invention and the drill press (viewed from right to left as seen in FIG. 1) with certain parts being broken away or not shown;

FIG. 3 is a fragmentary top plan view of the apparatus of this invention taken along lines 3—3 of FIG. 2 with certain parts being broken away or not shown;

FIG. 4 is a fragmentary front elevation of the apparatus of this invention as seen looking from front to rear in FIG. 3;

FIG. 5 is an enlarged top plan view of a guide plate forming a part of the spindle positioning apparatus;

FIG. 6 is a front elevation of the guide plate as seen looking from front to rear of FIG. 5;

FIG. 7 is a top plan view of a center stationary drill spindle positioning head;

FIG. 8 is a side elevation of the head of FIG. 7;

FIG. 9 is a top plan view of one inner movable spindle positioning head;

FIG. 10 is a side elevation of the head of FIG. 9;

FIG. 11 is a top plan view of one outer movable spindle positioning head;

FIG. 12 is a side elevation of the head of FIG. 11;

FIG. 13 is a top plan view of one end rail member;

FIG. 14 is a side elevation of the rail of FIG. 13;

FIG. 15 is a section taken along line 15—15 of FIG. 2 showing the positive locator assembly;

FIG. 16 is a fragmentary end elevational view showing the positive locator assembly as seen looking from right to left in FIG. 15;

FIG. 17 is an enlarged elevation of one of the gauge rods forming a part of the positive locator assembly;

FIGS. 18a through 18d are diagrammatic views illustrating the different circumferentially spaced series of longitudinally spaced bores provided in the gauge rod of FIG. 17;

FIG. 19 is a fragmentary enlarged side elevation of selector means for rotating or setting up certain elements of the spindle positioning apparatus;

FIG. 20 is a section taken along line 20—20 of FIG. 19;

FIG. 21 is a top plan view of a selector rod;

FIG. 22 is an enlarged fragmentary top plan view of the spindle positioning apparatus primarily illustrating one of the positioning rods and the solenoid assemblies associated with respective heads;

FIG. 23 is a section taken along line 23—23 of FIG. 22;

FIG. 24 is an enlarged section taken along line 24—24 of FIG. 23;

FIG. 25 is an enlarged fragmentary side elevation of the spindle positioning apparatus primarily illustrating one of the clamp assemblies for the heads;

FIG. 26 is an enlarged section taken along line 26—26 of FIG. 25; and

FIG. 27 is an enlarged section taken along line 27—27 of FIG. 25.

By way of introduction, the drill press which uses the present invention, which may be of the type known commercially as the NATCO Multiple Spindle Drill Press which is made by National Automatic Tool Co., includes a vertically reciprocal head assembly having a plurality of shafts depending therefrom each of which shafts supports a drill spindle at the lower end thereof. The shafts include a section having a universal joint at each end thereof thereby adapting each spindle to be adjusted or positioned horizontally while maintaining its axis of rotation vertical. The present invention consists of an assembly adapted to be secured beneath the head assembly of the drill press just below the lower universal joints of the shafts which drive the drill spindles.

Briefly, the drill spindle positioning apparatus includes a rectangular, horizontally disposed guide plate secured beneath the head assembly of the drill press in spaced relation therefrom so that the guide plate is disposed below the lower universal joints of the drill spindle shafts. The guide plate includes a number of parallel elongated openings or slots extending longitudinally of the guide plate for freely receiving the drill spindles and permitting adjustment or positioning of the latter longitudinally of the guide plate. The guide plate supports a pair of rails at its respective opposite ends, which rails extend transversely of the guide plate. The rails mount a pair of support rods beneath the guide plate in parallel spaced relation from the side marginal portions thereof. A number of separate drill spindle positioning heads, each of which heads is adapted to support a plurality of drill spindles in parallel spaced relation, are slidably supported at their respective opposite ends by the support rods for sliding movement along the underside of the guide plate in a rectilinear path defined by the axes of the support rods, which path is contained in a plane normal to the axes of rotation of the drill spindles. Axially reciprocal, fluid cylinder operated positioning rod means and rotatable selector rod means are associated with the heads for positioning the latter approximately in predetermined locations along the path defined by the axes of the support rods. Positive locator means supported beneath the heads for vertical reciprocal movement between a first position free of the heads and a second position in contact with the heads are provided for positively and accurately positioning the heads in place when the positive locator means is in its upper or second position. The positioning apparatus also includes clamp means associated with each head for securely clamping the latter in place after the heads have been accurately positioned by the positive locator means. Finally, the drill spindle positioning apparatus of this invention includes indicator means which serves to indicate the arrangement of drill bits to be connected to the drill spindles.

Referring to the drawings and particularly FIG. 1, a drill press which uses the positioning apparatus of this invention will be seen to include a base 10 supporting an upright portion 11, and a head assembly 12 which is suitably mounted to the upright portion for vertical reciprocal movement. Base 10 includes a workpiece supporting table 14 which has a pair of spaced, parallel roller assemblies 15 and 16 mounted on the upper surface thereof. The rollers of assemblies 15 and 16 are co-planar and adapted to support a workpiece beneath the head assembly. Suitable clamp means (not illustrated) is provided for accurately and securely clamping the workpiece in place on the roller assemblies. The roller assemblies permit a workpiece to be rolled to and away from a position beneath the head assembly; conveyor means (not shown) may be aligned with roller assemblies 15 and 16 for permitting a workpiece to be readily rolled or conveyed to a position beneath the head assembly for having work performed thereon and for being readily rolled away from the drill press after the work has been completed.

Head assembly 12 includes a horizontally disposed rectangular housing portion 18 which receives an input drive shaft 19 (FIG. 2) and houses suitable gearing (not shown) for simultaneously rotating a number of depending stub shafts upon rotation of input shaft 19. One stub shaft is illustrated in FIG. 2 and designated 20. Each stub shaft 20 is connected with a depending shaft section 22 by means of a universal joint 23, and each shaft section 22 is connected with a drill spindle 24 by means of a second universal joint 25. Each drill spindle 24 supports a chuck assembly 27 which in turn detachably mounts a drill bit 28.

Housing 18 of head assembly 12 supports a depending continuous skirt 30, which skirt is provided with a number of spaced openings 31 for permitting access to and observance of the portions of the drill spindle shafts. It should be apparent that by reason of shaft sections 22 and the universal joints at opposite ends thereof, the drill spindles 24 may be adjusted or positioned generally horizontally with the drill spindles maintained in the vertical and in driven relation with respective stub shafts 20.

The drill press also includes a control panel 33 supported on a column 34. The control panel carries a number of pushbuttons 35 for controlling the power unit for raising and lowering the head assembly 12 and for controlling the power unit for rotating the drill spindles.

The drill spindle positioning apparatus of this invention, generally designated 40, consists of an assembly mounted from head assembly 12 for vertical reciprocal movement with the latter. As best seen in FIGS. 1 through 5, drill spindle positioning apparatus 40 includes a horizontally disposed rectangular guide plate 41 secured at marginal portions thereof to a flange member 42 by a plurality of fasteners 43 (FIG. 2), flange 42 being secured as by welding to the lower edge of head assembly skirt 30. As seen in FIG. 5, guide plate 41 is provided with a plurality of tapped openings 44 for threading engagement with fasteners 43. The guide plate includes extended portions 41a and 41b at opposite ends thereof, and the guide plate includes a number of parallel, spaced, longitudinally extending slots 46–50. As noted in FIG. 2, the slots receive the drill spindles 24 and permit positioning or adjustment of the latter longitudinally of the guide plate. Formed in the upper surface of the guide plate at side marginal portions thereof are four inclined elongated recesses 52–55, which recesses co-operate with wedges forming part of clamp means for the positioning heads as will be explained hereinbelow. Each recess has a planar bottom inclined downwardly from the transverse center line of the guide plate toward the end of the latter. The guide plate also includes pairs of elongated recesses 57, 58 and 59, 60 along respective opposite sides thereof for receiving keys forming part of the clamp means to be explained below.

Guide plate 41 supports from its underside at its transverse center line an elongated, stationary, drill spindle receiving head 62 (FIGS. 7 and 8). Head 62 extends transversely of the guide plate and is secured to the underside thereof by a plurality of threaded fasteners (not shown) received in bores 63 in the guide plate and threadingly engageable in tapped holes 64 formed in the upper surface of head 62. Vertical bores 65 in opposite ends of head 62 receive tapered dowel pins 66. The dowel pins are secured in the lower end of bores 65 by set screw means 66a. Head 62 includes a pair of transversely extending support rod receiving openings 67 adjacent opposite ends thereof, and the head further includes a plurality of spaced, vertically extending, drill spindle receiving openings 68–71 spaced along the length thereof. Drill spindle openings 68–71 include respective enlarged portions 68a–71a in their lower ends. The drill spindle openings mount bearings for receiving the drill spindles 24. A typical bearing arrangement is illustrated in FIG. 2, wherein a cylindrical bearing for the drill spindle is designated 73 and a thrust bearing is indicated 74. Finally, head 62 includes a transversely extending opening 75 for rotatably receiving a selector rod to be referred to below. It will be understood that when head 62 is secured in place under the guide plate, drill spindle openings 68, 69, 70 and 71 are aligned with respective guide plate slots 46, 47, 49 and 50.

Guide plate 41 supports on its underside and adjacent its opposite ends a pair of end rails 78, 79, which end rails extend transversely of the guide plate and have their respective opposite ends projecting some distance from side marginal portions of the guide plate. As both end rails are identical, only one end rail 78 (illustrated in FIGS. 13 and 14) will be described. End rail 78 is secured to the underside of guide plate 41 adjacent one end thereof by a number of fasteners (not shown) received in openings 80 (FIG. 5) and having their lower ends threadingly engageable in tapped bores 81 formed in the upper surface of rail 78. Additional bores 82 are formed in the upper surface of rails 78 adjacent the ends thereof for mounting certain operating equipment. Rail 78 includes transversely extending support rod receiving openings 84, selector rod receiving opening 85, and openings 86 which accommodate certain elements of clamp actuating means to be referred to below. Rail 78 also includes a transversely extending positioning rod receiving opening 87 at the longitudinal midpoint thereof. Rail 78 further includes a pair of vertically extending through openings defined by bores 88 having co-axial reduced-in-diameter bore portions 89.

End rails 78 and 79 and center stationary head 62 support a pair of parallel support rods 92 and 93 (FIG. 2) in spaced relation beneath side marginal portions of the guide plate in longitudinal relation with the latter. Support rod 92 has its opposite ends received in one set of openings 84 in the end rails and its central portion received in one opening 67 in the center head 62. In like manner, the other support rod 93 has its opposite ends received in the other openings 84 in the rail members and its central portion received in the other opening 67 in the center head member.

A pair of movable, inner spindle positioning heads 97 and 98 are slidably supported on support rods 92, 93 on opposite sides of center stationary head 62. As both inner heads are of identical construction, only one head 98 (illustrated in FIGS. 9 and 10) will be described.

Head 98 includes adjacent its opposite ends respective transversely extending bores 99 and 100, which bores receive bushings (not shown) thereby to slidably mount head 98 on the support rods for reciprocal sliding movement longitudinally of the guide plate. It will be understood that when head 98 is slidably mounted in the manner just mentioned, the upper or top surface of the head slidably engages the underside or lower face of guide plate 41. Head 98 includes a transversely extending opening 101 at the midpoint thereof, which opening includes an enlarged portion 101a at one end thereof. Head 98 also includes a transversely extending selector rod receiving opening 102 and transversely extending key ways 104 and 104 at opposite ends thereof.

A vertically extending bore 105 is provided in the upper surface of head 98 at the midpoint thereof, which bore opens at the lower end thereof into opening 101. Movable head 98 also includes a plurality of vertically extending spaced drill spindle receiving openings 107 through 110, which openings have enlarged portions 107a–110a, respectively, at their lower portions. These drill spindle receiving openings receive the cylindrical bearings and thrust bearings associated with the drill spindles as shown in the typical illustration of FIG. 2. Finally, movable head 98 includes vertically extending bores 112, 112 adjacent its opposite ends, which bores mount depending tapered dowel pins 114, 114, the dowel pins being secured in the lower portion of the bores by set screw means 116. It will be understood that when movable head 98 is slidably disposed on the support rods as described above, drill spindle positioning openings 107, 108, 109 and 110 are aligned beneath respective guide plate slots 46, 47, 49 and 50.

A pair of outer, movable, spindle positioning heads 120 and 121 are slidably mounted on support rods 92, 93, outer head 120 being slidably disposed between rail 78 and inner head 97 and outer movable head 121 being slidably disposed between outer rail 79 and inner movable head 98. As both outer movable heads are of identical but opposite hand construction, only one outer movable head 121 (illustrated in FIGS. 11 and 12) will be described.

Outer movable head 121 is generally C-shaped having the bight portion thereof extending transversely of the guide plate and having gusset plates 123, 124 re-inforcing the head. Head 121 includes a pair of transversely extending support rod receiving openings 125 adjacent its respective opposite ends, which openings receive suitable bushings (not shown) for slidably mounting the head on support rods 92, 93, thereby mounting the head for reciprocal movement longitudinally of the guide plate. It will be understood that with the head mounted on the support rods in the manner just described, the upper planar surface of the head is in sliding contact with the underside of guide plate 41. Outer head 121 includes a transversely extending opening 126 at the midpoint thereof, which opening is adapted to receive a positioning rod to be referred hereinbelow. The head also includes a transversely extending selector rod receiving opening 128. Opposite ends of head 121 have transversely extending cutout portions defining respective ledges 129, which ledges are planar and in parallel relation with the upper surface of the head.

Movable head 121 includes two rows of drill spindle receiving openings. The first row of drill spindle receiving openings includes vertically extending openings 130, 131 and 132, which openings have respective enlarged portions 130a–132a at their lower ends. A second row of drill spindle receiving openings includes vertically extending openings 134 and 135 having respective enlarged portions 134a, 135a at their lower ends. Head 121 includes a pair of vertically extending openings 136 adjacent its respective opposite ends, which openings have tapered dowel pins 138 secured in their lower ends by set screw means 139, the dowel pins projecting from the undersurface of head 121. A vertically extending bore 141 is provided in the upper surface of head 121 at the midpoint thereof, which bore communicates at the lower end thereof with positioning rod receiving opening 126. A vertically extending bore 142 opens at one end thereof at the lower surface on the head 121 and communicates at the other end thereof with selector rod receiving opening 128. It will be understood that when head 121 is slidably mounted on support rods 92 and 93 in the manner described above, spindle receiving openings 130, 131 and 132 are in alignment with respective guide plate slots 46, 49 and 50, and drill spindle openings 134 and 135 are in alignment with respective guide plate slots 46 and 50.

Fluid pressure actuated means are provided for imparting sliding movement to spindle positioning heads 97 and 120, and separate fluid pressure operated means acting in unison with the first mentioned fluid pressure operated means are provided for imparting sliding movement to drill spindle positioning heads 98 and 121. These fluid pressure operated means include hydraulic cylinders 145, 146. See FIGS. 1, 3, 22 and 23. As both fluid pressure operated means for moving heads, 97, 120 and 98, 121 are identical, the fluid pressure operated means for moving heads 98, 121 (illustrated in FIGS. 22 and 23) will be described.

As noted in FIGS. 22 and 23, hydraulic cylinder 146 has one end thereof suitably secured to the outside surface of end rail 79, which cylinder includes a piston rod 148 freely reciprocal in sliding relation in opening 87 in the end rail. Piston rod 148 has the outer end thereof threaded and in threading engagement with a threaded bore formed in one end of a positioning rod 150, which positioning rod extends longitudinally of the guide plate and is freely slidable in openings 101 and 126 of heads 98 and 121, respectively. Positioning rod 150 includes a threaded blind bore at the other end thereof threadingly receiving a machine screw 151 which secures a circular plate 152 to the end of positioning rod. Plate 152 is adapted to be received in bore portion 102 formed in head 98 for providing outward sliding movement of the latter (from left to right as seen in FIGS. 22 and 23) upon withdrawal of piston rod 148. During this outward movement of head 98, the latter abuts outer head 121 and brings about corresponding outward sliding movement of the latter during withdrawal of the piston rod. As noted in FIG. 23, positioning rod 150 includes a pair of annular recesses 154, 155 spaced longitudinally thereof.

Outer movable head 121 has a block 158 suitably secured on its upper surface and near its mid portion, which block supports a solenoid assembly 159 (fragmentarily illustrated in FIG. 23) secured thereto by a number of fasteners 160. Solenoid assembly 159 includes a depending reciprocal rod 161, which rod includes a bore freely receiving the upper end of a pin 162. Rod 161 includes a pair of diametrically oppositely disposed, vertically elongated slots 163 which slidably receive respective diametrically oppositely disposed pins 164 which are secured to pin 162.

Pin 162 is freely reciprocal in an enlarged bore 166 formed in block 158, and pin 162 includes an annular flange 167 which abuts the lower end of a coil spring 168, the spring being contained in the annular space defined by the outside of pin 162 and the inside surface of bore 166. The upper end of spring 168 is retained beneath the collar member 169 encircling pin 162 and secured to the solenoid assembly by fasteners 170.

The lower end of pin 162 is vertically reciprocal in a bushing 171 which is secured in bore 141 formed in head 121. Spring 168 constantly urges pin 162 downwardly with the tip of the latter in engagement with the surface of positioning rod 150. When annular recess 155 of the positioning rod is brought into alignment with pin 162, the tip of the latter is urged by spring 168 into annular recess 155 thereby bringing about sliding movement of head 121 upon axial movement of the positioning rod.

Actuation of the solenoid causes upward movement of rod 161, and abutting engagement of the lower ends of slots 163 with small pins 164 causes lifting of pin 162 for withdrawal of the tip thereof from recess 155 in positioning rod. When the solenoid is de-energized, rod 161 is in its lower position whereby the upper ends of slots 163 are adjacent pins 164, thereby permitting downward movement of pin 162 under the influence of spring 168 when recess 155 of the positioning rod is aligned with the pin.

Inner movable heads 97 and 98 include a solenoid operated pin assembly identical to the solenoid actuated pin assembly of outer heads 120 and 121, and accordingly the solenoid operated pin assemblies associated with the inner heads will not be described in detail herein. The solenoid actuated pin assembly of inner movable head 98 is partially illustrated in FIGS. 22 and 23, and the parts thereof corresponding to identical parts of the solenoid actuated pin assembly described above are designated by the prime form of numeral.

It will be apparent then that when the tips of pins 162 and 162' are received in respective recesses 155, 154 of positioning rod 150, axial movement of the latter brings about sliding movement of the heads in a rectilinear path extending longitudinally of the guide plate. Before a cycle of operation of the apparatus for setting up or positioning the movable heads, the latter are disposed at their outermost positions, i.e., heads 120 and 121 are spaced adjacent respective end rails 78, 79, and heads 97, 98 are disposed adjacent respective heads 120 and 121 and pins 162, 162' are received in respective recesses 155, 154 of the positioning rods. When cylinders 145 and 146 are actuated, both positioning rods move inwardly toward each other in unison thereby carrying all spindle receiving heads inwardly of the positioning apparatus. Novel selector means are provided for actuating the solenoids thereby to withdraw the pins at the proper time to position the various heads in predetermined positions along their path of movement longitudinally of the guide plate.

The selector means just referred to includes a selector rod 175 (FIG. 21) having its opposite ends journaled in bushings 176, which bushings are received or secured in openings 85 provided in end rails 78 and 79. Selector rod 175 includes a plurality of circumferentially spaced series of longitudinally spaced indentations 180, 181, 182, etc. It will be understood that each series of indentations is different from each other series of indentations; the longitudinal spacing of indentations of each series determines the positioning of the heads as will be explained below. In the embodiment of the invention shown for purposes of illustration, the selector rod is provided with twelve series of indentations thereby providing twelve different predetermined arrangements in which all movable drill spindle positioning heads may be located. It will be understood that the selector rod is rotatably received in opening 75 of center stationary head 62, openings 102 of inner movable heads 97, 98 and openings 128 of outer movable heads 120 and 121.

Selector rod 175 has a sprocket wheel 184 fixedly mounted at one end thereof. This sprocket wheel is driven by a chain, to be explained below, for angularly positioning the selector rod.

Each movable spindle positioning head carries plunger actuated microswitch means adapted to be triggered or actuated by a selected indentation on the selector rod for energizing the pin actuated solenoid means carried by the head. The plunger actuated microswitch means carried by inner movable head 97 is illustrated in FIGS. 23 and 24; it will be understood that identical plunger actuated microswitch means are carried by each of the other movable spindle positioning heads.

Now referring especially to FIG. 24, it will be seen that a plunger 185 is slidably mounted in bore 103 of head 97, which plunger includes a stem 186 having the outer end thereof slidable in the bore of a collar 187 secured in the outer end of bore 103. The face of plunger 185 includes a semi-spherical recess in which is secured a ball 188, which ball is adapted to enter a selected indentation, such as one of the indentations 180, on selector rod 175. A spring 189 encircling stem 186 has one end thereof abutting the underside of the plunger and the other end thereof abutting the top surface of collar 187 for constantly urging the plunger upwardly for maintaining plunger ball 188 in one of the indentations of the selector rod or against the cylindrical surface of the latter as the case may be. A ring 191 is secured to the underside of head 97 in co-axial relation with opening 103, which ring threadingly receives a sleeve 192. Sleeve 192 includes a reduced-in-diameter central bore 193 mounting a microswitch 194 having an actuating detent 195. The lower end of sleeve 192 has a threaded enlarged bore 196 for threading engagement with a suitable conduit (not shown) for housing wiring attached to the microswitch.

When plunger ball 188 is not received in a selected indentation on the selector rod, i.e., when ball 188 engages the cylindrical surface of the selector rod, the lower end of stem 186 engages microswitch detent 195 and depresses the latter for opening the microswitch. When plunger ball 188, which forms a part of the plunger, is received in a selected indentation in the selector rod, the plunger is allowed to move upwardly thereby allowing detent 195 of the microswitch to move upwardly under the influence of a spring (not shown) forming a part of the microswitch, thereby closing microswitch 194. It will be understood that microswitch 194 is electrically connected with the solenoid assembly carried by head 97, and that during operation of the drill spindle positioning apparatus of this invention electrical power is applied to the solenoid. Therefore, when plunger ball 188 is received in a selected indentation, microswitch 194 is closed for completing the circuit to the associated solenoid thereby lifting the corresponding pin 162 from the annular recess in the positioning rod thereby to permit the positioning rod to slide freely through the now stationary drill spindle positioning head.

As will be explained in greater detail below, during simultaneous inward movement of positioning rods 150, all movable spindle positioning heads are carried inwardly of the spindle positioning apparatus and are dropped off or positioned longitudinally of the guide plate in a pattern corresponding to the pattern of the series of indentations occupying the twelve o'clock position of the selector rod. The movable heads are located or positioned in their desired positions within very close tolerances by the action of the positioning rods. It will be appreciated, however, that the heads must be precisely positioned or located and securely held within very close tolerances to insure that the pattern of holes to be bored in a workpiece adhere to desired tolerances which are very close in most instances. Accordingly, the drill spindle positioning apparatus of this invention includes further means for precisely and positively locating and holding the drill spindle positioning heads in their predetermined positions. These means are referred to as the positive locator means and are best seen in FIGS. 15 and 16.

The positive locator assembly, generally designated 200, includes a pair of parallel spaced support bars 201 and 202. Bar 201 includes transversely extending openings 203 (FIG. 16) which mount bearings 204. Bearings 204 journal respective, corresponding, reduced-in-diameter end portions of a pair of gauge rods 205, 206. In like manner, bar 202 includes a pair of transversely extending openings 208 adjacent its opposite ends, which openings mount bearings 209. Gauge bars 205, 206 include reduced-in-diameter portions at their other ends journaled in respective bushings 209. Gauge rods 205, 206 act to support and maintain bars 201, 202 in parallel spaced relation. As both bars are of identical construction only one bar 201, illustrated in FIG. 16, will be described in detail.

Bar 201 includes a pair of transversely extending openings 210 spaced inwardly of openings 203. The bar further includes a pair of vertically extending openings 211, which openings open into respective transversely extending openings 210.

As seen in FIG. 15, a pair of rods 214, 215 have their ends mounting gears which are rotatably received in respective openings 210 in bars 201, 202. One pair of gears mounted on the corresponding ends of rods 214, 215 are illustrated in FIG. 16 and are designated 216, 217, respectively. It will be noted that the teeth of gear 216, 217 extend into vertical openings 211. Gear 216, 217 extend beyond the outer surface of the corresponding bar and mesh with teeth on a horizontally reciprocal rack 218, which rack is slidably supported from the corresponding bar by suitable means (not shown). As noted in FIG. 15, a rack 218 is provided at each end of the positive locator assembly. The teeth on racks 218 meshing with gears 216, 217 at opposite ends of rods 214, 215 insure that all gears rotate together in unison.

Positive locator assembly 200 is mounted beneath the drill spindle positioning heads in horizontal disposition, and fluid pressure operated means are provided for imparting vertical reciprocal movement of the positive locator assembly. Assembly 200 is supported on two pairs of depending rack members, each pair of rack members being secured at their upper ends to one of end rails 78, 79. One pair of rack member is illustrated in FIG. 16 and designated 219, 220. It will be understood that rack 219 is typical of the other three racks suspended from the end rails. The upper end of rack 219 is cylindrical in form and received within vertical bore 88 formed within the end rail. The upper end of rack 219 includes a threaded blind bore threadingly engageable with one end of a threaded fastener which is received in opening 89 in the end rail thereby securing rack 219 to the former. The lower end of rack 219 is freely reciprocal in opening 211 in bar 201, and the lower end of rack 219 includes a row of teeth 211 in meshing engagement with teeth on the corresponding gear 216. It will be understood then that engagement of the teeth on racks 219, 220 with the teeth on respective gears 216, 217 mounts the positive locator assembly 200 in a horizontal plane for vertical reciprocal movement relative to the end rails, guide plate and drill spindle positioning heads, etc.

Fluid pressure operated means are provided for imparting this vertical reciprocal movement to the positive locator assembly. As seen in FIGS. 15 and 16, a pair of vertically extending hydraulic cylinders 222, 223 have their upper ends suitably secured, as by brackets 224, to the undersides of respective bars 201, 202 in co-axial relationship with openings 212 therein. Cylinder 222 identical in all respects to cylinder 223 includes a piston rod 225 freely reciprocal in opening 212 of bar 201, which piston rod has the upper end thereof tapped and threadingly engaged in threaded blind bore 90 provided in end rail 78 thereby securing the end of the piston rod to the rail. It should be apparent that actuation of cylinders 222, 223 results in vertical movement of the positive locator assembly 200.

Gauge rods 205 and 206 of the positive locator assembly are of identical construction, gauge rod 205 being shown in detail in FIG. 17. Gauge rod 205, which has its reduced-in-diameter opposite ends journaled in bars 201, 202, as explained above, includes a plurality of circumferentially spaced series of longitudinally spaced blind bores. In the embodiment of the invention shown for purposes of illustration, gauge rod 205 is provided with four equally spaced longitudinally extending, flat faces. A different pattern or series of blind bores is formed in each face of gauge rod 205. As twelve different arrangements of positions are made possible by selector rod 175 as explained above, each of the four series of bores in the gauge rods is adapted to position the movable heads in three different arrangements of positions of the latter.

These four different patterns or arrangements of blind bores are schematically indicated in FIGS. 18a-18d. As seen in FIGS. 18a-18d, gauge rod 205 includes four series of blind bores designated 226-229. Blind bores 226-229 are adapted to receive the depending dowel pins associated with the drill spindle positioning heads. Assuming that gauge rod 205 is rotated so that bores 226 occupy the twelve o'clock position of the rod, the bore 226a at the longitudinal midpoint of the rod receives dowel pin 67 of center stationary head 62 when the positive locator assembly 200 is raised by means of hydraulic cylinders 222, 223. From FIG. 18a, it will be noted that eight blind bores 226b are provided along gauge rod 205 in addition to midpoint bore 226a. As four movable drill positioning heads are shown in the embodiment of the invention shown for purposes of illustration, and as each movable head includes one dowel pin at each end thereof, only four of the eight bores 226b will be used at any one time. FIG. 18a illustrates one possible arrangement of the dowel pins and bores in the gauge rod. It should be apparent from FIG. 18a that with gauge rod 205 in a given angular position, each movable head may be located in two different positions and have the dowel pins thereof received in the blind bores in the gauge rod thereby accommodating the movable heads in at least three different combinations of positions. It is this reception of the tapered dowel pins at opposite ends of the heads in the blind bores of respective gauge rods that brings about accurate or precise locating or positioning of the movable drill spindle positioning heads. The blind bores in the gauge rod are precisely located longitudinally of the rods for bringing about accurate and positive positioning of positioning heads 97, 98, 120 and 121. Replaceable bushings may be mounted in the blind bores of the gauge rods.

FIG. 18b illustrates the arrangement or pattern of blind bores when gauge rod 205 has been rotated 90° from the position of FIG. 18a. This arrangement of blind bores accommodates outer heads 120, 121 in two different positions and accommodates inner movable heads 97, 98 in one position.

Further different arrangement of blind bores are illustrated in FIGS. 18c and 18d. As mentioned above, the arrangements or series of bores in the gauge rods are correlated with the series or arrangements of indentations of selector rod 175. As will be explained below, the angular position of the gauge rods are correlated with the angular position of the selector rod so that the gauge rods are properly positioned or rotated to have the blind bores thereof receive the dowel pins of the drill spindle positioning heads upon upward movement of the positive locator assembly for positive and accurately locating the movable heads in their desired positions.

As noted in FIGS. 3 and 15, gauge rod 205 includes integral reduced-in-diameter stems 205a at its opposite ends. A sprocket wheel 232 is fixedly mounted on one stem of the gauge rod and a second sprocket wheel 233 is fixedly mounted on the stem at the other end of the gauge rod. Gauge rod 206 includes a reduced-in-diameter stem 206a at one end thereof fixedly mounting a sprocket wheel 234. A chain 235 is trained over sprocket wheels 234 and 233 for causing rotation of the gauge rods in unison. As will be explained below, selector means including a chain trained over sprocket wheel 232 are provided for rotating or positioning the gauge rods in their proper positions.

As best seen in FIGS. 19 and 20, the selector means for rotating or setting up the selector rod and both gauge rods include a shaft 238 having one end thereof journaled in a bracket 239 which is secured to one end of bar 201 of the positive locator assembly. A crank arm 240 is slidably but non-rotatably mounted on shaft 238 by means of a key 241 slidably engageable with a key way 242 formed in bore 243 of the crank arm. A sprocket wheel 245, which has a hub 245a fixed thereto, is fixedly mounted on shaft 238, and a chain 246 is trained over sprocket wheel 245 and sprocket wheel 184 on selector rod 175. As noted in FIG. 20, chain 247 is engaged by the teeth of an idler sprocket 247 mounted on a bracket 247a which is suspended from a cylinder housing forming part of clamp means to be explained below. Sprocket 247 places a bend in the upper run of chain 246 when positive locator assembly 200 is raised to its upper position thereby to prevent the lower run of the chain from sagging. It will be apparent that rotation of crank arm 240 brings about rotation of the selector rod for angularly positioning the latter.

A drum 248 is fixedly mounted to shaft 238, which drum includes circumferentially spaced indicia in the form of numerals representing patterns of holes to be bored in a workpiece. A sprocket wheel 249 is rotatably mounted on shaft 238 but prevented from moving axially of the shaft by suitable stop means (not shown), and a chain 250 (FIG. 20) is trained over sprocket wheel 249 and sprocket wheel 232 fixedly mounted to one end of gauge rod 205. Sprocket wheel 249 has a hub 251 fixed thereto and bearing circumferentially spaced indicia corresponding to the various angular positions of the gauge rods. As the gauge rods have four positions spaced 90° apart, hub 251 is provided with indicia in the form of letters "A" through "D" equally spaced around its periphery for indicating the four gauge rod positions. Sprocket wheel 249 and hub 251 include aligned axially extending bores 252 offset from their axes of rotation.

Hub 245a, sprocket wheel 245 and drum 248 include aligned bores slidably receiving a pin 254 having one end thereof secured to crank arm 240. A coil spring 255 encircles pin 254 between the crank arm and hub portion 245a and presses the crank arm against a stop pin 256 secured to shaft 238. Sliding movement of the crank arm from right to left as seen in FIG. 19 results in entry of the free end of pin 254 into blind bore 252 of sprocket 249 and hub 251 thereby providing for rotation of sprocket 249 and hub 251 upon rotation of shaft 238 by crank 240. It should be apparent that when it is desired to set up or angularly position the gauge rods, crank arm 240 is slid on shaft 238 and then rotated until the gauge rods are brought to their desired position.

An arm 258 affixed to bracket 239 includes a bore supporting one end of a small coil spring 259. A small detent 260 is carried on the other end of spring 259, which detent is adapted to enter notches (not shown) provided on the face of drum 248, a notch being provided for each of the angular positions to be assumed by the drum. As the selector rod and gauge rods are rotated with drum 248, detent 260 engaging the recesses in the drum serves as a means for releasably locating the gauge rods and selector rod in their desired angular positions.

A selector plate 261 has spaced windows 261a and 261b through which respective indicia on hub 248 and hub 251 are viewed for the purpose of setting up the selector rod and the gauge rods in their desired positions. For example, if the gauge rods are to be rotated to position "B," hub 251 is rotated until the letter "B" is viewed within window 261b. If a pattern of holes initiated by number "1318" is to be bored, drum 248 is rotated until number "1318" is viewed within window 261a.

As seen in FIG. 19, a sleeve 262 has one end thereof secured to bracket 239. The other end of sleeve 262 is secured to a bracket 263 which is secured by suitable means to one end of bar 202. A light tube 264, which may be of the fluorescent type, is supported within the sleeve 262 in axial relationship with the latter.

Sleeve 262 includes a plurality of longitudinally spaced apertures 265. As will become apparent from the following description, the number of these apertures are correlated with the number of series of indentations in the selector rod and the number of rows of drill spindles carried by the positioning heads.

As noted in FIG. 1, a number of indicator plates 267, 268, 269 and 270 are supported by suitable bracket means (not shown) from respective movable heads 120, 97, 98 and 121, the indicator plates being supported in vertical disposition just outwardly of tube 262. The indicator plates include openings aligned in parallel relation with the row of apertures 265 in sleeve 262, which openings correspond to the number of rows of drill spindles of the associated movable head member. For example, indicator plate 267 includes openings 267a and 267b which correspond to the two rows of drill spindles of outer movable head 120; indicator plate 268 includes a single opening 268a corresponding the single row of drill spindles in inner movable head 97. The apertures in sleeve 262 are spaced in such a manner that when the movable heads are positioned in one of their twelve different arrangements for boring a certain pattern of holes, the rows of drill spindles to receive drill bits for boring such a pattern of holes have their associated indicator plate openings aligned with apertures in sleeve 262 thereby illuminating or lighting these indicator plate openings. Illumination of an indicator plate opening indicates to an operator of the drill press that drill bits are to be connected to the row of drill spindles corresponding to the illuminated indicator plate opening.

The drill spindle positioning apparatus of this invention includes a clamp assembly for each movable drill spindle positioning head for firmly clamping the latter in place after it has been positively positioned or located by the positive locator assembly. Referring to FIGS. 1, 4 and 25–27, the clamp assemblies for clamping corresponding ends of the movable heads include a pair of fluid operated cylinders 274, 275, fragmentarily illustrated in FIG. 4, which cylinders extend longitudinally of the guide plate and are secured to the near ends (as seen in FIG. 4) of outer rails 78 and 79, respectively. Cylinder 275, which operates the clamps for the corresponding ends of heads 98, 121, is illustrated in FIG. 25 and includes a piston rod 276 having the outer end thereof threaded and in threading engagement with a suitable bore in a block 277 apertured for receiving a horizontally disposed pivot pin 278. A pair of parallel spaced bars 279 are pivoted at their midpoints on pin 278, one on each side of block 277. A block 281 has a slot in which is received a pin 282 having its opposite ends secured in aligned openings in corresponding ends of bars 279. An upper push rod 283 has a threaded end thereof in threading engagement in a threaded bore in block 281 and locked thereto by means of a lock nut 284.

A block 286 includes a slot receiving a pin 287 having its opposite ends secured in openings in corresponding lower ends of bars 279. A lower push rod 288 has a threaded end thereof threadingly engaged in a threaded bore in block 286 and locked to the block by means of a lock nut 289.

Lower push rod 288 is freely reciprocal in opening 86 in end rail 79, and this push rod has a threaded end threadingly engaged in a threaded bore in a lower wedge 290. A small plate 291 is secured to the outer surface of rail 79 over opening 86 therein, which plate includes an opening for slidably supporting lower push rod 288 thereby to guide the latter and to limit outward movement of wedge 290 by abutting engagement of its outer end with plate 291.

Upper push rod 283 is freely reciprocal in a bore provided in a block 293 secured to the side of guide plate 41 by fasteners 294. A nut 295 is secured on push rod 283 intermediate the ends thereof, as by welding, which nut has a face thereof slidable along the top surface of the guide plate at the margin thereof. This sliding engagement between nut 295 and the guide plate serves to support push rod 283 for horizontal sliding movement. Push rod 283 has its inner end threaded and in threading engagement in a suitable bore formed in one end of an upper wedge 296.

The clamp construction at one end of outer movable head 121 is illustrated in FIGS. 25 and 26. A clamp member 298 is fixedly mounted to guide plate 41 by means of a key 299 received in part in recess 58 in the guide plate and received in part in a recess 300 formed in clamp 298 and by a number of fasteners 301 received in suitable bores in clamp 298 and key 299 and threadingly engaged in tapped bores in the guide plate. Clamp 298 includes an inwardly extending flange 298a at its lower portion, which flange includes an upwardly facing, inclined, planar surface 298b in complementary sliding engagement with inclined planar surface 290a of wedge 290. As noted in FIG. 25, these inclined surfaces slope upwardly in a direction inwardly and longitudinally of the positioning apparatus. As noted in FIGS. 25 and 26, the upper surface of wedge 290 is flat, horizontally disposed and in sliding engagement with flat ledge 129 of outer movable head 121. It should be apparent that movement of wedge 290 inwardly of the positioning apparatus results in clamping head 121 between parallel spaced surfaces defined by the underside of guide plate 41 and the upper surface of wedge 290. This clamping action is of course brought about by the complementary engagement of inclined surfaces 290a and 298b of wedge 290 and clamp member 298, respectively. Further, it should be apparent that the stroke of lower push rod 288, which operates wedge 290, will be substantially the same regardless of the location or position of head 121 longitudinally of guide plate 41 as clamp member 298, which includes inclined surface 298b for complementary engagement with inclined surface 290a of wedge 298, is fixedly mounted to the guide plate.

The clamp construction for clamping one end of inner movable head 98 is illustrated in FIGS. 25 and 27. A clamp member 304 is fixedly mounted to one end of inner movable head 98 by a key 305 received in part in key way 104 in the head and received in part in a key way 306 formed in clamp 304, and by a plurality of fasteners 307 received in suitable bores in clamp member 304 and threadingly engaged in tapped blind bores in head 98. An inwardly extending flange 304a is formed on the upper end of clamp member 304, which flange includes a downwardly facing, flat, horizontally extending surface 304b. Wedge 296 has a planar inclined lower surface 296a in complementary sliding engagement with inclined recess 53 formed in the upper guide plate. Wedge 296 has an upper, flat, horizontally disposed surface in sliding engagement with clamp surface 304b. It should be apparent that upon inward movement of wedge 296 inwardly of the positioning device, clamp 304 is urged upwardly by reason of inclined surfaces 296a and 53 on the wedge and guide plate, respectively, thereby securely clamping movable head 98 to the underside of the guide plate. Further, it will be apparent that the length of the stroke of upper push rod 283, which operates wedge 296, is substantially the same regardless of the position of inner head 98 longitudinally of the guide plate as the vertical distance between the horizontal surfaces defined by the underside of the guide plate and clamp surface 304b remains the same irrespective of the position of head 98.

By reference to FIG. 25 it will be apparent that actuation of cylinder 275 for bringing about movement of piston rod 276 inwardly of the cylinder results in forcing wedges 290 and 296 inwardly of the positioning device for clamping corresponding ends of respective movable heads 121, 98, in place. If wedge 296, for example, should become fully seated before wedge 290 is fully seated, piston rod 276 is permitted to continue its inward movement for fully seating wedge 290 as bars 297 pivot about pin 278. This pivotal construction between the push rods and the piston rod of the fluid cylinder insures full and complete seating for both wedges upon inward movement of the piston rod. It will be apparent that upon actuation of cylinder 275 for withdrawing the piston rod thereof, both wedges 290, 296 will be substantially simultaneously moved outwardly of the positioning device thereby unclamping the ends of the associated heads. Outward movement of upper push rod 283 is limited by engagement of nut 295 with block 293, and outward movement of lower push rod 288 is limited by abutting engagement of the outer end of wedge 290 with plate 291. It will be understood that the clamp assembly just described is typical of the clamp assembly provided at the opposite ends of heads 98, 121 and at both ends of heads 97, 120.

Summarizing briefly, as the apparatus of this invention is designed for boring a number of different patterns of holes (twelve different patterns in the embodiment shown for purposes of illustration) in workpieces, the selector rod and the gauge rods are provided with respective indentations and bores for locating the movable heads along their path of movement at the predetermined positions for locating the drill spindles according to the pattern of bores to be formed. Further, indicator tube 262 is provided with an arrangement of apertures for luminating the openings in the indicator plates carried by respective heads to indicate to an operator of the device the particular rows of drill spindles to which drill bits are to be attached. The various patterns of holes to be bored are preferably designated by separate numbers, which numbers are circumferentially spaced around drum 248 associated with the indicator means.

It should be noted that the positioning apparatus shown for purposes of illustration is adapted to bore different standardized patterns of holes as the drill spindles and bits carried by the various movable heads may only be positioned longitudinally of the guide plate. Of course, in effect the spacing between drill bits laterally of the guide plate may be altered as in any row of drill spindles carried by the movable heads only certain or even none of the spindles may receive drill bits. By way of illustration only, the apparatus of this invention is adapted to position drill spindles for drilling patterns of holes in mold plates forming parts of the mold bases disclosed in U.S. Patents 2,874,409 and 3,025,570.

The operation of the drill spindle positioning apparatus of this invention is as follows:

Prior to positioning the heads along their path longitudinally of the guide plate, positive locator assembly 200 must be lowered so that the various blind bores in the gauge rods are free of the dowel pins depending from the movable heads. If positive locator assembly 200 is not in its lower position, fluid cylinders 222, 223 are actuated for lowering the positive locator assembly.

Next, gauge rods 205, 206 associated with positive locator assembly 200 are angularly positioned so that the desired series of blind bores are rotated to the twelve o'clock position of the gauge rods. Both gauge rods 205, 206 are simultaneously rotated by sliding crank arm 240 along shaft 238 (FIG. 19) until the end of pin 254 is received within blind bores 252 of sprocket 249 and hub 251.

Drum 248 is rotated by crank 240 until the number corresponding to the pattern of holes to be drilled is visible through window 261a of plate 261. Rotary positioning of drum 248 in the manner just described results in rotating the selector rod 175 to an angular position wherein the proper series of spaced indentations assume the twelve o'clock position, selector rod 175 being rotated along with drum 248 by reason of chain 246 trained over sprockets 184 and 245 (FIGS. 19 and 20).

Let it be assumed that it is desired to drill a pattern of holes in a workpiece, the pattern being identified by number "1318." This number, along with the numbers of other bore patterns, is printed on indicator plate 261 along with the corresponding indicia in the form of letters identifying the angular position to be given to gauge rods 205, 206 of the positive locator assembly. Let it be assumed that pattern "1318" requires the gauge rods to be rotated to an angular position identified as "B." Accordingly, crank 240 is slid along shaft 238 until the end of pin 254 is received within blind bores 252 of sprocket 249 and hub 251. Now, crank arm 240 is rotated until the letter "B" is positioned within window 261b of indicator plate 261. For purposes of illustration, let it be assumed that when letter "B" is positioned in window 261b, gauge bars 205, 206, assume the position illustrated in FIG. 18b. Rotation of sprocket 249 brings about rotation of gauge rod 205 by reason of chain 250 trained over sprocket 249 and sprocket 232, and gauge rod 206 rotates in unison with gauge rod 205 by reason of chain 235 trained over sprockets 233 and 234 (FIG. 15). After positioning the gauge rods in the manner just described, crank arm 240 is allowed to slide outwardly on shaft 238 under the influence of spring 255 so that pin 254 is withdrawn from bores 252 in sprocket 249 and hub 251.

Now, drum 248 is rotated by crank 240 until number "1318" is positioned within window 261a of plate 261 (FIG. 19). Rotation of the drum to a position wherein the desired number is visible within window 261a results in positioning the proper series of indentations on the selector rod in the twelve o'clock position of the latter, as drum 248 and selector rod 175 are connected for simultaneous rotation by means of chain 246 trained over sprockets 245 and 184.

Next, fluid cylinders 145 and 146 (FIGS. 3, 22 and 23) are actuated for moving positioning rods 150 inwardly of the drill positioning apparatus. It will be recalled that when the movable heads are in their initial positions, i.e., at their positions before being positioned or dropped off along their path of movement axially of the guide plate, the ends of pins 162 are received in the corresponding annular recesses 154, 155 of the positioning rods. Accordingly, inward movement of positioning rods 150 brings about movement of all movable heads inwardly of the drill positioning apparatus. As each movable head slides along the selector rod it reaches a position wherein the plunger detent 188 associated with the head is received in the selected indentation in the selector rod, microswitch 194 is actuated thereby energizing the corresponding solenoid assembly 159 for lifting pin 162 and thereby withdrawing the lower end of the latter from the associated annular recess in the positioning rod. Therefore, as the plunger detents are received in their selected indentations in the selector rod, the movable heads are dropped off or approximately positioned along their path as the positioning rods continue for their full stroke inwardly of the apparatus. Suitable limit means (not shown) associated with fluid cylinders 145 and 146 are provided for limiting the inward stroke of movement of positioning rods 150.

This dropping off of the movable heads from the moving positioning rods serves to position the movable heads in their approximate positions along their path of movement longitudinally of the guide plate. Next, fluid cylinders 222, 223 of the positive locator assembly are actuated for raising positive locator assembly 200. Gauge rods 205, 206, which have already been positioned as just described above, receive the tapered dowel pins depending from the drill spindle positioning heads and accurately and positively locate the movable heads in place.

Finally, fluid cylinders 274, 275 are actuated for operating the clamp assemblies. The clamp assemblies firmly clamp the movable positioning heads in place.

The rows of drill spindles in the heads to which drill bits are to be connected have their corresponding openings in indicator plates 267–270 illuminated by apertured sleeve 262 as explained above. The operator of the device then attaches the drill bits as indicated after which time the drill press may be operated for boring the selected pattern of holes.

When it is desired to set up a different arrangement of the movable heads for boring a different pattern of holes, cylinders 274, 275 are actuated for releasing the clamp assemblies, cylinders 222, 223 are actuated for lowering positive locator assembly 200 and then cylinders 145, 146 are actuated for withdrawing all movable heads to their outermost positions. Then the gauge rods and selector rod are rotated as required for the next pattern of holes to be bored.

It will be realized that manually operated means may be provided for moving the heads and positive locator assembly, that manually operated fluid cylinder means may be provided for moving these parts or that fluid operated cylinders 145, 146, 222 and 223 may be suitable interconnected and provided with limit switches so that movement of all movable drill positioning heads followed by upward movement of the positive locator assembly may be accomplished in an automatic manner.

It will be appreciated that different arrangements of positions of the heads may be provided by merely changing the gauge rods, selector rod, and the appropriate indicating means.

While the invention has been shown in but one form it will be obvious to those skilled in the art that it is not to be so limited. On the contrary the invention is susceptible of various changes and modifications without departing from the spirit and scope of the appended claims. In this regard it will be realized that while two pairs of movable heads have been shown in the embodiment of the invention illustrated, any reasonable number of pairs of movable heads may be provided. One or more stationary heads may be provided or stationary heads may not be used depending of course on the particular pattern of holes to be bored. Further, it will be appreciated that the positioning means of this invention has equal utility with a drill press wherein the drill spindles are horizontally disposed and horizontally movable for contact with the work. Also, it will be realized that the present invention has utility in positioning other forms of cutting tools.

I claim:

1. Apparatus for positioning a plurality of parallel elongated tools comprising, at least two positioning heads each of which is adapted to support at least one of the elongated tools, means mounting said heads for independent movement along a rectilinear path which is contained in a plane disposed generally normal of the longitudinal axes of the elongated tools, positioning means for moving said heads along said path, rotary selector rod means including a selector rod rotatably mounted in parallel relation with said path, said selector rod having means along the length thereof serving through the medium of other means to actuate said positioning means for positioning said heads at predetermined locations along said path in response to the angular position of said selector rod.

2. Apparatus for positioning a plurality of parallel elongated tools comprising, at least two positioning heads each of which is adapted to support at least one of the elongated tools, means mounting said heads for independent movement along a rectilinear path which is contained in a plane disposed generally normal of the longitudinal axes of the elongated tools, selector rod means and positioning rod means extending in parallel relation with said path associated with said heads for positioning the latter at predetermined locations along said path, said selector rod means including a selector rod slidably and rotatably associated with the heads, and said positioning rod means including a positioning rod slidably associated with the heads.

3. Apparatus for positioning a plurality of parallel elongated tools comprising, at least two positioning heads each of which is adapted to support at least one of the elongated tools, means mounting said heads for independent movement along a rectilinear path which is contained in a plane disposed generally normal to the longitudinal axes of the elongated tools, selector rod means and positioning rod means extending in parallel relation with said path and associated with said heads for positioning the latter at predetermined locations along said path, positive locator means supported for reciprocal movement normally of said plane between a first position free of said heads and a second position in locking engagement with said heads, said locator means being adapted when in the second position thereof positively to locate and hold said heads in any of the predetermined positions thereof along said path.

4. The apparatus according to claim 3 wherein each of said heads includes a dowel pin and wherein said positive locator means includes a rotatably supported rod disposed in parallel relation with said path, which gauge rod is provided with a plurality of circumferentially spaced series of longitudinally spaced bores, said dowel pins being received in selected bores when the positive locator means is in said second position thereby positively to secure said heads in their positions along said path.

5. Apparatus for positioning a plurality of drill spindles comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, a positioning rod contiguous with said heads and supported in parallel relation with said path, which rod is provided with a pair of longitudinal spaced recesses and is associated with means for imparting axial reciprocal movement to the rod, each head carrying a solenoid operated pin one end of which is adapted to be received in one of the recesses so that movement of the rod causes corresponding movement of the head, the end of each pin being withdrawn from the associated recess upon actuation of the associated solenoid, a selector rod contiguous with said heads and rotatably supported in parallel relation with said path, which rod is provided with a plurality of circumferentially spaced series of longitudinally spaced indentations, separate switch means carried by each head and including plunger means adapted to extend into a selected indentation for causing actuation of the switch means, each head having the solenoid and switch means carried thereby electrically connected with each other, whereby upon movement of the heads by the positioning rod entry of the plungers into selected indentations causes withdrawal of the pins for locating the heads along said path thereby to position the drill spindles.

6. Apparatus for positioning a plurality of drill spindles comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, each head being provided with a first bore, said first bores being axially disposed in parallel relation with said path, a positioning rod slidably disposed in said first bores and means for imparting axial reciprocal movement to the rod, which rod includes a pair of longitudinally spaced recesses, each head including a second bore communicating with the associated first bore and supporting a pin one end of which is adapted to extend into one of said recesses so that movement of the positioning rod causes corresponding movement of the associated head, separate solenoid means carried by each head and connected with the associated pin for withdrawing said one end of the latter from the corresponding recess, each head being provided with a third bore parallel with its first bore, which third bores are co-axial, a selector rod slidably and rotatably disposed in said third bores and means for rotating the former, which selector rod is provided with a plurality of circumferentially spaced series of longitudinally spaced indentations, each head including a fourth bore communicating with the associated third bore and supporting plunger means one end of which is adapted to extend into said indentations, separate resilient means for holding each of the plungers in contact with the selector rod and for forcing the former into a selected indentation, separate switch means carried by each head and associated with the corresponding plunger so that movement of the latter into one of the indentations causes actuation of the switch means, each head having the switch means and the solenoid means carried thereby electrically connected with each other, whereby upon movement of the heads by the positioning rod entry of the plungers into selected indentations causes withdrawal of the pins for locating the heads along said path thereby to position the drill spindles.

7. Apparatus for positioning a plurality of parallel elongated tools comprising, at least two positioning heads each of which is adapted to support at least one of the elongated tools, means mounting said heads for independent movement along a rectilinear path which is contained in a plane disposed generally normal to the longitudinal axes of the elongated tools, movable positioning rod means extending parallel with said path and slidably associated with each head, separate releasable means connecting each head with the positioning rod means for movement of the former with the latter, selector rod means extending parallel with said path and rotatably and slidably associated with each head, separate control means associated with each head and being operable in response to movement of the latter with the selector rod means being turned to a predetermined rotational position, each head having its control means connected with its releasable means in a manner for causing actuation of the latter upon operation of the former thereby to permit relative movement between the head and the positioning rod means, whereby rotational positioning of the selector rod means followed by movement of the positioning rod means results in positioning of said heads.

8. Apparatus for positioning a plurality of drill spindles comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, movable positioning rod means extending parallel with said path and slidably associated with each head, separate releasable means connecting each head with the positioning rod means for movement of the former with the latter, selector rod means extending parallel with said path and rotatably and slidably associated with each head, separate control means associated with each head and being operable in response to movement of the latter with the selector rod means being turned to a predetermined rotational position, each head having its control means connected with its releasable means in a manner for causing actuation of the latter upon operation of the former thereby to permit relative movement between the head and the positioning rod means, positive locator means mounted for reciprocal movement normally of said plane between a first position free of said heads and a second position in contact with said heads, said locator means being adapted when in the second position thereof positively to locate said heads in all positions thereof along said path, whereby rotational positioning of the selector rod means followed in series by movement of the positioning rod means and movement of the locator means to the second position thereof results in positive positioning of the drill spindles.

9. Apparatus for use with a drill press for positioning the drill spindles thereof, said apparatus comprising, at least two spindle positioning heads each of which is adapted to support a plurality of the drill spindles in parallel spaced relation, means mounting said heads for movement along a rectilinear path which is contained in a plane disposed generally normal to the axes of rotation of the drill spindles, axially movable positioning rod means extending parallel with said path and slidably associated with each head, separate releasable means connecting each head with the positioning rod means for movement of the former with the latter and adapted to be released to permit relative movement between each head and the positioning rod means, selector rod means extending parallel with said path and rotatably and slidably associated with each head, which selector rod means includes a selector rod provided with a plurality of circumferentially spaced series of longitudinally spaced actuator means, separate control means associated with each head and being operable when in contiguous relation with a selected actuator means, each head having its control means connected with its releasable means in a manner for causing actuation of the latter upon operation of the former thereby to permit relative movement between the head and the positioning rod means, whereby rotational positioning of the selector rod followed by movement of the positioning rod means results in positioning the drill spindles.

10. Apparatus for use with a drill press for positioning the drill spindles thereof, said apparatus comprising, at least two spindle positioning heads each of which is adapted to support a plurality of the drill spindles in parallel spaced relation, means mounting said heads for movement along a rectilinear path which is contained in a plane disposed generally normal of the axes of rotation of the drill spindles, axially movable positioning rod means extending parallel with said path and slidably associated with each head, separate releasable means connecting each head with the positioning rod means for movement of the former with the latter and adapted to be released to permit relative movement between each head and the positioning rod means, selector rod means extending parallel with said path and rotatably and slidably associated with each head, which selector rod means includes a selector rod provided with a plurality of circumferentially spaced series of longitudinally spaced actuator means, separate control means associated with each head and being operable when in contiguous relation with a selected actuator means, each head having its control means connected with its releasable means in a manner for causing actuation of the latter upon operation of the former to permit relative movement between the head and the positioning rod thereby approximately to position the drill spindles along said path upon rotational positioning of the selector rod followed by movement of the positioning rod means, positive locator means mounted for reciprocal movement normally of said plane between a first position free of said heads and a second position in contact with said heads, said locator means being adapted when in the second position thereof positively and accurately to locate said heads in all positions thereof along said path, and separate releasable clamp means for each head for clamping the latter in place after movement of the locator means to the second position thereof.

11. Apparatus for use with a drill press for positioning the drill spindles thereof, said apparatus comprising, at least two spindle positioning heads each of which is adapted to support a plurality of the drill spindles in parallel spaced relation, means mounting said heads for independent movement along a rectilinear path which is contained in a plane disposed generally normal to the axes of rotation to the drill spindles, selector rod means and positioning rod means extending in parallel relation with said path and associated with said heads for positioning the latter at predetermined locations along said path, said selector rod means including a rotatably mounted selector rod provided with a plurality of circumferentially spaced series of longitudinally spaced actuator means, said locations being determined by the rotational position of the selector rod, positive locator means mounted for reciprocal movement normally of said plane between a first position free of said heads and a second position adjacent said heads, which locator means include a rotatably supported gauge rod extending in parallel relation with said path and provided with a plurality of circumferentially spaced series of longitudinally spaced first means adapted for complementary engagement with second means on each head, when said locator means is in the second position thereof, for positively locating the heads in place along said path, the number of series of first means being less than the number of series of actuator means and each series of first means being adapted for complementary engagement with said second means for positively locating the heads in a plurality of different positions.

12. The apparatus according to claim 11 wherein each of said series of longitudinally spaced first means comprises said gauge rod being provided with a plurality of longitudinally spaced bores and wherein said second means includes a dowel pin adapted to be received in a selected bore, the number of bores in each series thereof being greater than the number of actuator means in each series thereof.

13. The apparatus according to claim 11 wherein selector means are provided seslectively to rotate said selector rod and said gauge rod in unison or to rotate only said selector rod.

14. Apparatus for use with a drill press for positioning the drill spindles thereof, said apparatus comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, an axially movable positioning rod supported adjacent said heads in parallel relation with said path, which rod is provided with a pair of longitudinally spaced recesses, means for imparting axial movement to the positioning rod, each head supporting a pin for reciprocal movement, one end of which pin is adapted to extend into one of said recesses so that movement of the positioning rod causes corresponding movement of the associated head, separate actuator means carried by each head and connected with the associated pin for withdrawing said one end of the latter from the corresponding recess, a selector rod rotatably supported adjacent said heads, which selector rod is provided with a plurality of circumferentially spaced series of longitudinally spaced indentations, each head supporting a plunger for reciprocal movement, one end of which plunger is adapted to extend into said indentations, separate means for forcing each plunger into a selected indentation, separate operating means carried by each head and associated with the corresponding plunger for being operated by the latter upon its movement into a selected indentation, each head having its operating means and its actuator means connected with each other so that movement of its plunger into a selected indentation causes withdrawal of its pin to permit relative movement between the operating rod and the head.

15. The apparatus according to claim 14 further defined by the provision of positive locator means supported for reciprocal movement normally of said plane between a first position free of said heads and a second position in contact with said heads, said locator means being adapted when in the second position thereof positively to locate said heads in all positions thereof along said path.

16. Apparatus for use with a drill press for positioning the drill spindles thereof, said apparatus comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, separate indicator plate means carried by said heads, respectively, which plate means are aligned along a line parallel with said path, axially reciprocal positioning rod means and rotatable selector rod means extending in parallel relation with said path and associated with said heads for positioning the latter at predetermined locations along said path, and elongated indicator means extending in parallel relation with said path and adjacent all of said plate means, which indicator means is adapted to co-operate with said plate means for indicating the arrangement of drills to be connected to the drill spindles.

17. Apparatus for use with a drill press for positioning the drill spindles thereof, said apparatus comprising, at least two spindle positioning heads each of which is adapted to support a plurality of drill spindles in parallel spaced relation, means mounting said heads for independent movement along a rectilinear path which is contained in a plane disposed generally normal to the axes of rotation of the drill spindles, separate indicator plate means carried by said heads, respectively, which plate means are aligned along a line parallel with said path, each plate means having at least one viewing aperture therein, axially reciprocal positioning rod means and rotatable selector rod means extending in parallel relation with said path and associated with said heads for positioning the latter at predetermined locations along said path, and an elongated indicator element extending in parallel relation with said path and adjacent all of said plate means, which indicator means includes a plurality of longitudinally spaced indicator means, said indicator means being adapted to be viewed through the apertures of said plate means for indicating the arrangement of drills to be connected to the drill spindles.

18. Apparatus for use with a drill press for positioning the drill spindles thereof, said apparatus including, a guide plate supported in a plane generally normal to the axes of rotation of the drill spindles, at least two spindle positioning heads each of which is adapted to support at least one of the drill spindles, means mounting said heads for independent sliding movement in a common rectilinear path along one face of said guide plate, means for positioning said heads in predetermined positions along said path, each head including means defining a first planar surface in parallel spaced relation with said guide plate face, means integral with said guide plate defining a second inclined planar surface in confronting spaced relation with said first surface, a wedge for each head and means for mounting the former for reciprocal movement along a path parallel to the path of movement of said heads, which wedge has one face thereof slidably engaged with said first mentioned surface and an opposite inclined face thereof slidably engaged with said second mentioned surface, whereby each head is clamped in place upon movement of the associated wedge in one direction thereof.

19. Apparatus for use with a drill press for positioning the drill spindles thereof, said apparatus including, a guide plate supported in a plane generally normal to the axes of rotation of the drill spindles, at least two spindle positioning heads each of which is adapted to support at least one of the drill spindles, means mounting said heads for independent sliding movement in a common rectilinear path along one face of said guide plate, said heads having opposite ends disposed adjacent respective opposite sides of the guide plate, means for positioning said heads in predetermined positions along said path, one of said heads having a planar surface adjacent one of its ends, which surface is parallel and spaced from the surface thereof which slidably engages said guide plate face, a clamp member fixedly mounted to the side of the guide plate adjacent said one end of said head, which clamp member has an inclined surface in spaced confronting relation with said surface of said one head, said inclined surface being inclined in a direction extending generally longitudinally of the guide plate, a wedge mounted for reciprocal movement along a path parallel to the path of movement of said heads, said wedge having one face thereof slidably engageable with said first mentioned surface and an opposite inclined face thereof slidably engaged with said second mentioned surface, whereby said one end of said head is clamped in place upon movement of said wedge in one direction thereof.

20. Apparatus for use with a drill press for positioning the drill spindles thereof, said apparatus including, a guide plate supported in a plane generally normal of the axes of rotation of the drill spindles, at least two spindle positioning heads each of which is adapted to support at least one of the drill spindles, means mounting said heads for independent sliding movement in a common rectilinear path along one face of said guide plate, said heads having opposite ends disposed adjacent respective opposite sides of said guide plate, means for positioning said heads in predetermined positions along said path, said guide plate having an elongated recess along the marginal portion of the face thereof opposite said face, which recess has a planar bottom inclined in a direction generally longitudinally of the guide plate, a clamp member fixed to one end of one of said heads, which clamp member includes a surface which is in confronting relation with the bottom of the recess and in parallel spaced relation with the second mentioned face of the guide plate, a wedge mounted for reciprocal movement along a path parallel to the path of movement of said heads, said wedge having one face thereof slidably engageable with said surface and an opposite inclined face thereof slidably engaged with said bottom of the recess, whereby said one end of said head is clamped against the guide plate upon movement of said wedge in one direction thereof.

References Cited by the Examiner
FOREIGN PATENTS 4,026  1912  Great Britain.

FRANCIS S. HUSAR, *Primary Examiner.*